(12) United States Patent
Murray et al.

(10) Patent No.: US 12,436,043 B2
(45) Date of Patent: Oct. 7, 2025

(54) METHODS PROVIDING DISTRIBUTED TEMPERATURE AND STRAIN MEASUREMENTS AND RELATED SENSORS

(71) Applicant: The Government of the United States of America, as represented by the Secretary of the Navy, Arlington, VA (US)

(72) Inventors: Matthew Joseph Murray, Alexandria, VA (US); Joseph Brady Murray, Ellicott City, MD (US); Hannah Marie Ogden, Glen Burnie, MD (US); Brandon F. Redding, University Park, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 268 days.

(21) Appl. No.: 18/474,855

(22) Filed: Sep. 26, 2023

(65) Prior Publication Data

US 2024/0118144 A1   Apr. 11, 2024

Related U.S. Application Data

(60) Provisional application No. 63/377,620, filed on Sep. 29, 2022.

(51) Int. Cl.
*H04B 10/00* (2013.01)
*G01D 5/353* (2006.01)
*G01K 11/322* (2021.01)

(52) U.S. Cl.
CPC ....... *G01K 11/322* (2021.01); *G01D 5/35364* (2013.01)

(58) Field of Classification Search
CPC .. G01K 11/322; G01K 11/32; G01D 5/35364; G01D 5/35361
See application file for complete search history.

(56) References Cited

U.S. PATENT DOCUMENTS 7,283,216 B1 * 10/2007 Geng ................. G01D 5/35303
356/477
8,744,782 B2 * 6/2014 Chen ....................... G01L 1/243
702/41

(Continued)

FOREIGN PATENT DOCUMENTS

CN   105783758 B   7/2016
CN   107091698 B   9/2019

(Continued)

OTHER PUBLICATIONS

Soto et al., "Optimization of long-range BOTDA sensors with high resolution using first-order bi-directional Raman amplification," Optics Express (USA), vol. 19, No. 5, Feb. 2011, 14 pages.

(Continued)

*Primary Examiner* — Agustin Bello
(74) *Attorney, Agent, or Firm* — US Naval Research Laboratory; Scott C. Hatfield

(57) ABSTRACT

Methods providing distributed temperature and strain measurements are disclosed. Brillouin pump laser pulses having a Brillouin pump frequency are coupled into a first end of an optical fiber. Brillouin Stokes and Anti-Stokes probe laser beams are coupled into a second end of the fiber. The Stokes probe laser beam has a Stokes probe frequency. The Anti-Stokes probe laser beam has an Anti-Stokes probe frequency. The Stokes and Anti-Stokes probe frequencies and the pump frequency are included in a Brillouin frequency band. A train of Rayleigh seed pulses are coupled into the fiber. Each of the seed pulses of the train has a respective different frequency included in a Rayleigh frequency band.

(Continued)

Frequencies of the Brillouin frequency band are coupled to a Brillouin detector, and Rayleigh backscatter signals are coupled to a Rayleigh detector. Brillouin and Rayleigh detector outputs are used to calculate the measurements. Related sensors are also disclosed.

23 Claims, 13 Drawing Sheets

(56) References Cited

U.S. PATENT DOCUMENTS

| | | | |
|---|---|---|---|
| 8,982,340 B2 | 3/2015 | Peled et al. | |
| 9,629,528 B2* | 4/2017 | Woods | A61B 1/0661 |
| 10,274,345 B2* | 4/2019 | Lanticq | G01D 5/35358 |
| 10,794,733 B2* | 10/2020 | Lanticq | G01K 11/32 |
| 10,912,462 B2* | 2/2021 | Wang | A61B 5/14546 |
| 10,973,462 B2* | 4/2021 | Rapp | A61B 5/4878 |
| 11,265,079 B2* | 3/2022 | Rochat | G01M 11/3118 |
| 11,366,243 B2* | 6/2022 | Jaaskelainen | E21B 47/135 |
| 11,473,983 B2* | 10/2022 | Murray | G01K 3/00 |
| 11,662,229 B2 | 5/2023 | Kwon et al. | |
| 11,965,758 B2* | 4/2024 | Nakamura | G01D 5/35364 |
| 12,235,140 B2* | 2/2025 | Hill | G01K 15/005 |
| 12,372,406 B2* | 7/2025 | Murray | G01J 3/4412 |
| 2005/0213869 A1* | 9/2005 | Brown | G01D 5/35364 |
| | | | 374/E11.015 |
| 2006/0285850 A1* | 12/2006 | Colpitts | G01D 5/35364 |
| | | | 374/E11.015 |
| 2013/0229649 A1* | 9/2013 | Li | G01M 5/0091 |
| | | | 356/73.1 |
| 2014/0033825 A1* | 2/2014 | Ravet | G01M 5/0091 |
| | | | 73/800 |
| 2015/0308923 A1* | 10/2015 | Chin | G01M 11/085 |
| | | | 356/73.1 |
| 2016/0109223 A1* | 4/2016 | Wang | G01K 11/32 |
| | | | 356/32 |
| 2017/0108358 A1* | 4/2017 | Bastianini | G01D 5/35303 |
| 2017/0153178 A1* | 6/2017 | Gruner-Nielsen | |
| | | | G02B 6/02252 |
| 2017/0176221 A1* | 6/2017 | Hartog | G01D 5/35364 |
| 2017/0248448 A1* | 8/2017 | Horiguchi | H01S 5/0085 |
| 2017/0254191 A1* | 9/2017 | Barfoot | G01V 3/18 |
| 2017/0260846 A1* | 9/2017 | Jin | E21B 47/113 |
| 2017/0334574 A1* | 11/2017 | Wilson | H04J 14/0227 |
| 2017/0334575 A1* | 11/2017 | Wilson | G01K 11/3206 |
| 2017/0336268 A1* | 11/2017 | Wilson | G01K 11/32 |
| 2017/0336269 A1* | 11/2017 | Wilson | G01K 11/3206 |
| 2018/0223647 A1* | 8/2018 | Johnston | E21B 47/113 |
| 2019/0170547 A1* | 6/2019 | Morel | G01D 5/35364 |
| 2020/0166384 A1* | 5/2020 | Zhou | G01D 5/35358 |
| 2020/0370928 A1* | 11/2020 | Ip | G01K 11/322 |
| 2020/0408636 A1* | 12/2020 | Takahashi | G01M 11/319 |
| 2021/0024200 A1* | 1/2021 | Rogers | G01K 11/32 |
| 2021/0173111 A1* | 6/2021 | Therrien | E21B 47/113 |
| 2021/0215515 A1* | 7/2021 | Kwon | G01L 1/242 |
| 2021/0239549 A1* | 8/2021 | Maida | E21B 47/135 |
| 2021/0270667 A1* | 9/2021 | Ellmauthaler | H04B 10/071 |
| 2022/0050012 A1* | 2/2022 | Redding | G01M 11/3109 |
| 2022/0146563 A1* | 5/2022 | Dong | H01B 9/008 |
| 2022/0186612 A1* | 6/2022 | Maida, Jr. | G01V 1/208 |
| 2022/0381139 A1* | 12/2022 | Cerrahoglu | E21B 47/07 |
| 2022/0381645 A1* | 12/2022 | Nakamura | G01M 11/39 |
| 2023/0206119 A1* | 6/2023 | Cerrahoglu | G06N 20/00 |
| | | | 706/12 |
| 2023/0221153 A1* | 7/2023 | Noto | G01D 21/02 |
| | | | 356/73.1 |
| 2023/0332932 A1* | 10/2023 | Murray | G01K 11/322 |
| 2024/0118144 A1* | 4/2024 | Murray | G01D 5/35361 |
| 2024/0361159 A1* | 10/2024 | Kishida | G01M 11/083 |
| 2025/0146843 A1* | 5/2025 | Ip | G01M 11/39 |
| 2025/0207955 A1* | 6/2025 | Jostmeier | G01D 5/35364 |
| 2025/0237139 A1* | 7/2025 | Cerrahoglu | E21B 47/095 |

FOREIGN PATENT DOCUMENTS

| | | |
|---|---|---|
| CN | 210981350 U | 7/2020 |
| WO | 2019221534 A1 | 11/2019 |

OTHER PUBLICATIONS

Soto et al., "Long-range simplex-coded BOTDA sensor over 120 km distance employing optical preamplification," Optics Letters (USA), vol. 36, No. 2, Jan. 2011, pp. 232-234, 3 pages.

Song et al., "Distributed strain measurement with milimeter-order spatial resolution based on Brillouin optical correlation domain analysis," Optics Letters (USA), vol. 31, No. 17, Sep. 2006, pp. 2526-2528, 3 pages.

Dominguez-Lopez et al., "Resolving 1 million sensing points in an optimized differential time-domain Brillouin sensor," Optics Letters (USA), vol. 42, No. 10, May 2017, 1903-1906, 4 pages.

Dominguez-Lopez et al., "Signal-to-Noise Ratio Improvement in BOTDA Using Balanced Detection," IEEE Photonics Technology Letters (USA), vol. 26, No. 4, Feb. 2014, pp. 338-341, 4 pages.

Denisov et al., "Going beyond 1000000 resolved points in a Brillouin distributed fiber sensor: theoretical analysis and experimental demonstration," Light: Science & Applications (China), vol. 5, e16074, 2016, 8 pages.

Ferdinand, "The Evolution of Optical Fiber Sensors Technologies During the 35 Last Years and Their Applications in Structure Health Monitoring," 7th European Workshop on Structural Health Monitoring, EWSHM 2014—2nd Eur. Conf. Progn. Heal. Manag. Soc. (Germany), 914-929, 2014, 16 pages.

Zhao et al., "Distributed shape sensing using Brillouin scattering in multi-core fibers," Optics Express (USA), vol. 24, No. 22, Oct. 2016, 13 pages.

Peled et al., "Fast Brillouin optical time domain analysis for dynamic sensing," Optics Express (USA), vol. 20, No. 8, Apr. 2012, pp. 8584-8591, pages.

Bernini et al., "Dynamic strain measurement in optical fibers by stimulated Brillouin scattering," Optics Letters (USA), vol. 34, No. 17, Sep. 2009, pp. 2613-2615, 3 pages.

Zhou et al., "Slope-assisted BOTDA based on vector SBS and frequency-agile technique for wide-strain-range dynamic measurements," Optics Express (USA), vol. 25, No. 3, Feb. 2017, pp. 1889-1902, 14 pages.

Ba et al., "Distributed measurement of dynamic strain based on multi-slope assisted fast BOTDA," Optics Express (USA), vol. 24, No. 9, May 2016, pp. 9781-9793, 13 pages.

Zheng et al., "Distributed vibration measurement based on a coherent multi-slope-assisted BOTDA with a large dynamic range," Optics Letters (USA), vol. 44, No. 5, Mar. 2019, pp. 1245-1248, 4 pages.

Motil et al., "Pump-Power-Independent Double Slope-Assisted Distributed and Fast Brillouin Fiber-Optic Sensor," IEEE Photonics Technoogy Letters (USA), vol. 26, No. 8, Apr. 2014, pp. 797-800, 4 pages.

Peled et al., "Monitoring the propagation of mechanical waves using an optical fiber distributed and dynamic strain sensor based on BOTDA," Optics Express (USA), vol. 21, No. 9, May 2013, pp. 10697-10704, 9 pages.

Peled et al., "Slope-assisted fast distributed sensing in optical fibers with arbitrary Brillouin profile," Optics Express (USA), vol. 19, No. 21, 2011, pp. 19845-19854, 10 pages.

Minardo et al., "Heterodyne slope-assisted Brillouin optical time-domain analysis for dynamic strain measurements," Journal of Optics (UK), vol. 18, No. 2, 2016, 7 pages.

Iribas et al., "Non-Local Effects in Brillouin Optical Time-Domain Analysis Sensors," Applied Sciences (Switzerland), vol. 7, 2017, 12 pages.

Murray et al., "Suppressing non-local effects due to Doppler frequency shifts in dynamic Brillouin fiber sensors," Optics Express (USA), vol. 28, No. 8, Apr. 2020, pp. 10760-10771, 12 pages.

Murray et al., "Combining Stokes and anti-Stokes interactions to achieve ultra-low noise dynamic Brillouin strain sensing," APL Photonics (USA) 5, 116104, 2020, 10 pages.

(56) References Cited

OTHER PUBLICATIONS

Urricelqui et al., "BOTDA measurements tolerant to non-local effects by using a phase-modulated probe wave and RF demodulation," Optics Express (USA), vol. 21, No. 14, Jul. 2013, pp. 17186-17194, 9 pages.
Urricelqui et al., Dynamic BOTDA measurements based on Brillouin phase-shift and RF demodulation, Optics Express (USA), vol. 20, No. 24, 2012, pp. 26942-26949, 8 pages.
Marinelarena et al., "Gain Dependence of the Phase-Shift Spectra Measured in Coherent Brillouin Optical Time-Domain Analysis Sensors," Journal of Lightwave Technology (USA), vol. 34, No. 17, Sep. 2016, 9 pages.
Yang et al., "Strain Dynamic Range Enlargement of Slope-Assisted BOTDA by Using Brillouin Phase-Gain Ratio," Journal of Lightwave Technology (USA), vol. 35, No. 20, Oct. 2017, p. 4451-4458, 8 pages.
Yang et al., "Brillouin Distributed Optical Fiber Sensor Based on a Closed-Loop Configuration," Journal of Lightwave Technology (USA), vol. 36, No. 5, Mar. 2018, pp. 1239-1248, 10 pages.
Urricequi et al., "Polarization Diversity Scheme for BOTDA Sensors Based on a Double Orthogonal Pump Interaction," Journal of Lightwave Technology (USA), vol. 33, No. 12, Jun. 2015, pp. 2633-2638, 6 pages.
Kadum et al., "Characterization of the Noise Induced by Stimulated Brillouin Scattering in Distributed Sensing," Sensors (Switzerland), vol. 20, 2020, 15 pages.
Thevenaz et al., "Impact of pump depletion on the determination of the Brillouin gain frequency in distributed fiber sensors," 21st International Conference on Optical Fibre Sensors (Canada), Proc. of SPIE vol. 7753, 2011, 4 pages.
Shlomovits et al., "The Effect of Source Phase Noise on Stimulated Brillouin Amplification," Journal of Lightwave Technology (USA), vol. 33, No. 12, Jun. 2015, pp. 2639-2645, 7 pages.
Minardo et al., "Analysis of SNR penalty in Brillouin optical time-domain analysis sensors induced by laser source phase noise," Journal of Optics (United Kingdom), vol. 18, No. 2, 2016, 10 pages.
Bernini et al., "Long-range distributed Brillouin fiber sensors by use of an unbalanced double sideband probe," Optics Express (USA), vol. 19, No. 24, Nov. 2011, pp. 23845-23856, 12 pages.
Minardo et al., "A Simple Technique for Reducing Pump Depletion in Long-Range Distributed Brillouin Fiber Sensors," IEEE Sensors Journal (USA), vol. 9, No. 6, Jun. 2009, pp. 633-634, 2 pages.
Lopez-Gil et al., "Simple Baseband Method for the Distributed Analysis of Brillouin Phase-Shift Spectra," IEEE Photonics Technology Letters (USA), vol. 28, No. 13, Jul. 2016, pp. 1379-1382, 4 pages.
Zhang et al., "Ultra-long dual-sideband BOTDA with balanced detection," Optics & Laser Technology (Netherlands), vol. 68, May 2015, pp. 206-210, 5 pages.
Dominguez-Lopez et al., "Strong Cancellation of RIN Transfer in a Raman-Assisted BOTDA Using Balanced Detection," IEEE Photonics Technology Letters (USA), vol. 26, No. 18, Sep. 2014, pp. 1817-1820, 4 pages.
Lopez-Gil et al., "Simple Method for the Elimination of Polarization Noise in BOTDA Using Balanced Detection and Orthogonal Probe Sidebands," Journal of Lightwave Technology (USA), vol. 33, Issue 12, Jun. 2015, pp. 2605-2610, 6 pages.
Yang et al., "Stokes and anti-Stokes differential pulse pair based distributed Brillouin fiber sensor with double- sideband probe wave," Optics Express (USA), vol. 22, Issue 3, Feb. 2014, pp. 2881-2888, 8 p.
Hotate et al., "Suppression of Signal Fluctuation in Brillouin Optical Correlation Domain Analysis System Using Polarization Diversity Scheme," IEEE Photonics Technology Letters (USA), vol. 18, Issue 24, Dec. 2006, pp. 2653-2655, 3 pages.
Shmilovitch et al., "Dual-pump push-pull polarization control using stimulated Brillouin scattering," Optics Express (USA), vol. 19, Issue 27, Dec. 2011, pp. 25873-25880, 8 pages.
Xu et al., "Simultaneous temperature sensing using distributed cascading fiber Bragg grating-based single-ended Brillouin optical time-domain analyzer," Laser Physics (UK), vol. 28, No. 12, Oct. 2018, 5 pages.
Chen et al., "Distributed Fiber-Optic Acoustic Sensor With Enhanced Response Bandwidth and High Signal-to-Noise Ratio," Journal of Ligthwave Technology (USA), vol. 35, Issue 10, May 2017, pp. 2037-2043, 7 pages.
Preussler et al., "Brillouin scattering gain bandwidth reduction down to 3.4MHz," Optics Express (USA), vol. 19, Issue 9, Apr. 2011, pp. 8565-8570.
Yang et al., "Enhancing strain dynamic range of slope-assisted BOTDA by manipulating Brillouin gain spectrum shape," Optics Express (USA), vol. 26, Issue 25, Dec. 2018, pp. 32599-32607, 9 pages.
Zornoza et al., "Brillouin distributed sensor using RF shaping of pump pulses," Measurement Science and Technology (UK), vol. 21, No. 9, Jul. 2010, 9 pages.
Liehr, et al., "Wavelength-scanning coherent OTDR for dynamic high strain resolution sensing," Optics Express (USA), vol. 26, Issue 8, pp. 10573-10588 (2018).
Koyamada, et al., "Fiber-Optic Distributed Strain and Temperature Sensing With Very High Measurand Resolution Over Long Range Using Coherent OTDR," Journal of Lightwave Technology (USA), vol. 27, Issue 9, pp. 1142-1146 (May 2009).
Zhou, et al., "Distributed Strain and Vibration Sensing System Based on Phase-Sensitive OTDR," IEEE Photonics Technology Let. (USA), vol. 27, Issue 17, pp. 1884-1887, Sep. 1, 2015.
Kersey, et al., "Fiber grating sensors," J. Lightwave Technology (USA), vol. 15, Issue 8, pp. 1442-1462 (1997).
Lee, et al., "Utilization of a dispersion-shifted fiber for simultaneous measurement of distributed strain and temperature through Brillouin frequency shift," IEEE Photonics Technology Letters (USA), vol. 13, Issue 10, pp. 1094-1096, Oct. 2001.
Zou, et al., "Dependence of the Brillouin frequency shift on strain and temperature in a photonic crystal fiber," Opt. Lett., vol. 29, Issue 13, pp. 1485-1487 (Jul. 2004).
Murray, et al., "Dynamic temperature-strain discrimination using a hybrid distributed fiber sensor based on Brillouin and Rayleigh scattering," Optics Express, vol. 31, Issue 1, pp. 287-300 (Jan. 2023).
Cruz, et al., "Measurement of phase and group refractive indices and dispersion of thermo-optic and strain-optic coefficients of optical fibers using weak fiber Bragg gratings," Applied Optics, vol. 60, Issue 10, pp. 2824-2832 (Apr. 2021).
Juarez, et al., "Distributed fiber optic intrusion sensor system," J. Light. Technol., vol. 23, No. 6, pp. 2081-2087 (Jun. 2005).
Wada, et al., "Fiber-optic simultaneous distributed monitoring of strain and temperature for an aircraft wing during flight," Appl. Opt., vol. 57, No. 36, pp. 10458-10465 (Dec. 2018).
He, et al., "High-resolution quasi-distributed temperature and pressure sensing system for deep-sea reservoir monitoring," Measurement 199, 111568, 10 pages (Apr. 2022).
Jones, "Review of Fibre Sensor Techniques for Temperature-Strain Discrimination," in 12th International Conference on Optical Fiber Sensors (OSA, 1997, Washington, D.C.), vol. 16, No. 2, pp. 36-39.
Parker, et al., "Simultaneous distributed measurement of strain and temperature from noise-initiated Brillouin scattering in optical fibers," IEEE J. Quantum Electron, vol. 34, No. 4, pp. 645-659, Apr. 1998.
Kee, et al., "All-fiber system for simultaneous interrogation of distributed strain and temperature sensing by spontaneous Brillouin scattering," Opt. Lett., vol. 25, No. 10, pp. 695-697 (May 2000).
Liu, et al., "Brillouin spectrum in LEAF and simultaneous temperature and strain measurement," J. Light. Technol., vol. 30, No. 8, pp. 1053-1059 (Apr. 2012).
Ruiz-Lombera, et al., "Simultaneous temperature and strain discrimination in a conventional BOTDA via artificial neural networks," J. Light. Technol., vol. 36, No. 11, pp. 2114-2121, Jun. 2018.
Li, et al., "Few-mode fiber multi-parameter sensor with distributed temperature and strain discrimination," Opt. Lett., vol. 40, No. 7, 1488 (Apr. 2015).

(56) References Cited

OTHER PUBLICATIONS

Zou, et al., "Stimulated Brillouin scattering and its dependences on temperature and strain in a high-delta optical fiber with F-doped depressed inner-cladding," Opt. Lett., vol. 32, No. 6, pp. 600-602 (Mar. 2007).
Li, et al., "Temperature and Strain Discrimination in BOTDA Fiber Sensor by Utilizing Dispersion Compensating Fiber," IEEE Sens. J., vol. 18, No. 17, pp. 7100-7105, Sep. 2018.
Karapanagiotis, et al., "Distributed humidity fiber-optic sensor based on BOFDA using a simple machine learning approach," Opt. Express, vol. 30, No. 8, pp. 12484-12494, (Mar. 2022).
Alahbabi, et al., "Simultaneous temperature and strain measurement with combined spontaneous Raman and Brillouin scattering," Opt. Lett., vol. 30, No. 11, pp. 1276-1278, Jun. 2005.
Zhou, et al., "Distributed temperature and strain discrimination with stimulated Brillouin scattering and Rayleigh backscatter in an optical fiber," Sensors, vol. 13, No. 2, pp. 1836-1845 (2013).
Murray, et al., "Distributed Brillouin fiber laser sensor," Optica, vol. 9, No. 1, pp. 80-87 (Jan. 2022).
Costa, et al., "Fully Distributed Optical Fiber Strain Sensor With 10-12 $\epsilon/\sqrt{Hz}$ Sensitivity," J. Light. Technol., vol. 37, No. 18, pp. 4487-4495 (Sep. 2019).
Ogden, et al., "Frequency multiplexed coherent φ-OTDR," Sci. Rep. 11(1), pp. 1-12 (2021).
Zou, et al., "Complete discrimination of strain and temperature using Brillouin frequency shift and birefringence in a polarization-maintaining fiber," Opt. Express, vol. 17, No. 3, pp. 1248-1255 (Feb. 2009).
Zou, et al., "Demonstration of Brillouin Distributed Discrimination of Strain and Temperature Using a Polarization-Maintaining Optical Fiber," IEEE Photonics Technol. Lett., vol. 22, No. 8, pp. 526-528 (Apr. 2010).
Dong, et al., "High-spatial-resolution time-domain simultaneous strain and temperature sensor using brillouin scattering and birefringence in a polarization-maintaining fiber," IEEE Photonics Technol. Lett., vol. 22, No. 18, pp. 1364-1366 (Sep. 2010).
Lu, et al., "Temperature-strain discrimination in distributed optical fiber sensing using phase-sensitive optical time-domain reflectometry," Opt. Express, vol. 25, No. 14, pp. 16059-16071, Jul. 2017.
Hu, et al., "Strain-induced vibration and temperature sensing BOTDA system combined frequency sweeping and slope-assisted techniques," Opt. Express, vol. 24, No. 12, pp. 13610-13620, Jun. 2016.

Coscetta, et al., "Hybrid Brillouin/Rayleigh sensor for multiparameter measurements in optical fibers," Opt. Express, vol. 29, No. 15, pp. 24025-24031 (Jul. 2021).
Zhou, et al., "Hybrid B-OTDR / Φ-OTDR for multi-parameter measurement from a single end of fiber," Opt. Express, vol. 30, No. 16, pp. 29117-29127 (Aug. 2022).
Masoudi, et al., "Contributed review: Distributed optical fibre dynamic strain sensing," Rev. Sci. Instrum., vol. 87, No. 1, pp. 11501-1 to 11501-9 (2016).
Von Der Weid, et al., "On the characterization of optical fiber network components with optical frequency domain reflectometry," J. Light. Technol., vol. 15, No. 7, pp. 1131-1141, Jul. 1997.
Pastor-Graells, et al., "Single-shot distributed temperature and strain tracking using direct detection phase-sensitive OTDR with chirped pulses," Opt. Express, vol. 24, No. 12, pp. 13121-13133, Jun. 2016.
Chen, et al., "Fiber-optic distributed acoustic sensor based on a chirped pulse and a non-matched filter," Opt. Express, vol. 27, No. 20, pp. 29415-29434, (Sep. 2019).
Soller, et al., "High resolution optical frequency domain reflectometry for characterization of components and assemblies," Opt. Express, vol. 13, No. 2, pp. 666-674 (Jan. 2005).
Zhang, et al., "Analysis and Reduction of Large Errors in Rayleigh-Based Distributed Sensor," J. Light. Technol., vol. 37, No. 18, pp. 4710-4719 (Sep. 2019).
Mizuno, et al., "Brillouin scattering in multi-core optical fibers for sensing applications," Sci. Rep., vol. 5, pp. 1-9 (Jun. 2015).
Tanaka, et al, "Brillouin frequency shift measurement with virtually controlled sensitivity," Appl. Phys. Express, vol. 10, No. 6, pp. 062504-1 to 062504-4 (May 2017).
Zhi, et al., "Research on COTDR for measuring distributed temperature and strain," in 2011 Second International Conference on Mechanic Automation and Control Engineering (IEEE, 2011), (1), pp. 590-593.
Song, et al., "Operation of Brillouin dynamic grating in single-mode optical fibers," Opt. Lett., vol. 36, No. 23, pp. 4686-4688, Dec. 2011.
Kishida, et al., "Study of optical fibers strain-temperature sensitivities using hybrid Brillouin-Rayleigh system," Photonic Sensors, vol. 4, No. 1, pp. 1-11 (2014).
Kersey, et al., "Fiber Grating Sensors," Journal of Lightwave Technology (USA), vol. 15, No. 8, part 1, pp. 1442-1452, Aug. 1997.
Kersey, et al., "Fiber Grating Sensors," Journal of Lightwave Technology (USA), vol. 15, No. 8, part 2, pp. 1453-1463, Aug. 1997.

* cited by examiner

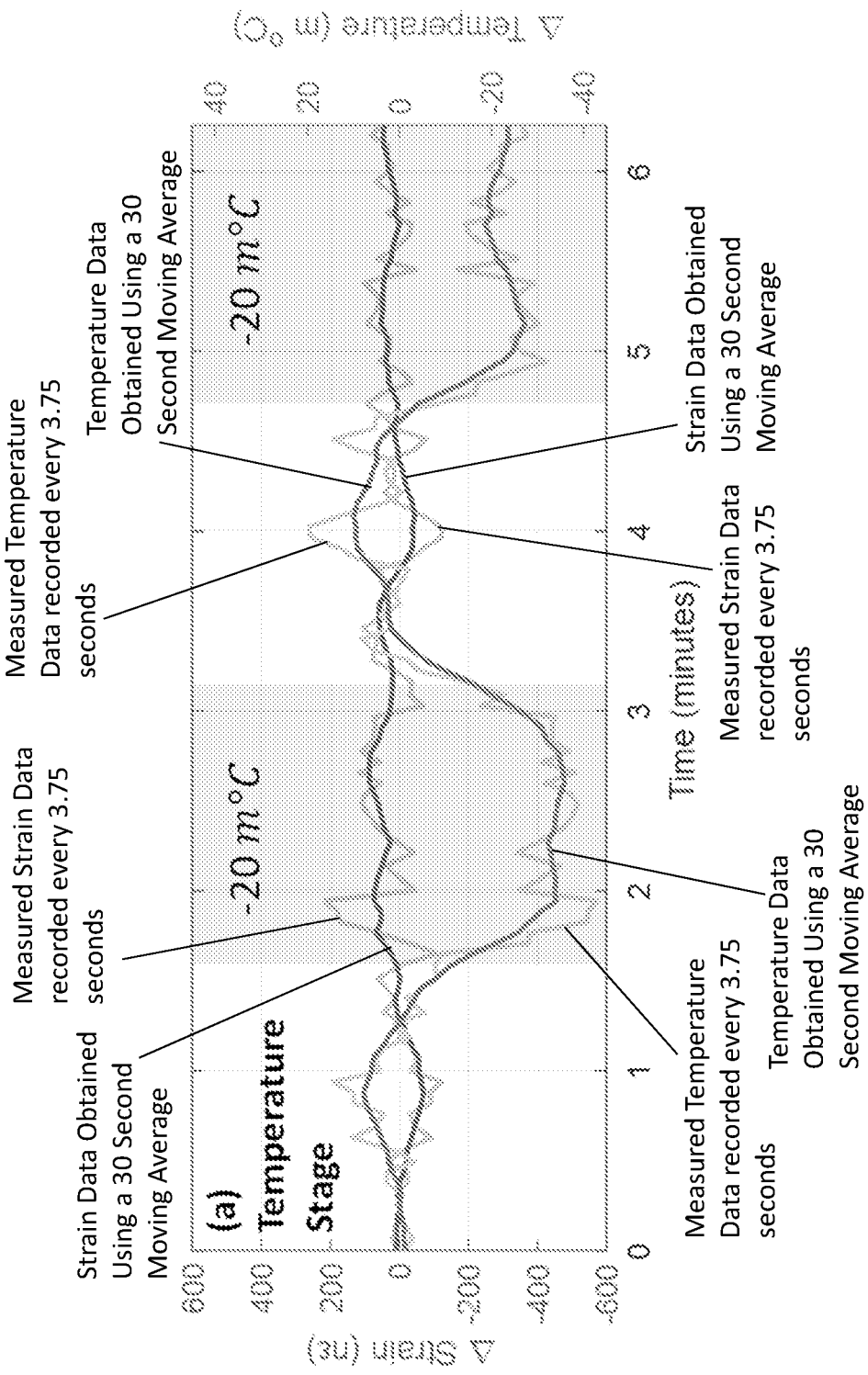

METHODS PROVIDING DISTRIBUTED TEMPERATURE AND STRAIN MEASUREMENTS AND RELATED SENSORS

CROSS REFERENCE TO RELATED APPLICATION

This Application is a Nonprovisional Utility Patent Application and claims the benefit of priority under 35 U.S.C. Sec. 119 based on U.S. Provisional Patent Application No. 63/377,620 filed on Sep. 29, 2022. The disclosure of Provisional Application No. 63/377,620 and all references cited herein are hereby incorporated in their entirety by reference into the present disclosure.

FEDERALLY SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #211156-US2.

TECHNICAL FIELD

The present disclosure relates to methods providing temperature and strain measurements and related sensors.

BACKGROUND OF THE INVENTION

Distributed fiber optic sensors have been used for a wide variety of applications including perimeter security (see, Reference 1), structural health monitoring (see, Reference 2), and seismic sensing (see, Reference 3). These fiber-based systems may provide advantages over more conventional sensing mechanisms, including remote operation, integration into harsh and/or hard-to-reach environments, and/or increased immunity to electromagnetic interference. However, many distributed fiber sensors may exhibit cross-sensitivity between temperature and strain, including sensors based on Brillouin scattering, Rayleigh scattering, and fiber Bragg gratings. Such sensors may thus be unable to effectively discriminate between temperature and strain. In some applications, this can be addressed by deploying a second sensing fiber that is, for example, isolated from strain to provide a reference measurement of temperature. However, this may be impractical in many cases and researchers have proposed a variety of techniques to discriminate between temperature and strain in a single fiber.

These discrimination techniques may operate by recording at least two measurands with distinct temperature and strain dependencies (see, Reference 4). For example, discrimination systems based on Brillouin scattering have combined measurements of the Brillouin frequency shift (BFS) with the intensity of spontaneous Brillouin scattering (see, References 5 and 6), the linewidth of the Brillouin resonance (see, References 7 and 8), the Brillouin resonance of different modes in a few-mode fiber (see, Reference 9), or measurements of higher-order Brillouin resonances (see, References 10, 11, 12, 13, and 14). Hybrid systems (see, References 15 and 16) have also been proposed. Ultimately, the sensitivity of these discrimination systems depends on the accuracy of the two underlying measurements and the orthogonality of their temperature/strain response (see, References 4 and 12).

Although these temperature/strain discrimination systems have advanced considerably since their first introduction, their sensitivities may remain considerably worse than state-of-the-art sensors designed to measure strain on its own or temperature on its own. For example, recent Brillouin sensors have demonstrated strain noise as low as ~10 $n\varepsilon/\sqrt{Hz}$ (see, References 17 and 18) while Rayleigh systems may achieve noise of ~1 $p\varepsilon/\sqrt{Hz}$ (see, References 19 and 20) ignoring the temperature cross sensitivity. In contrast, many temperature/strain discrimination systems may be limited to a strain uncertainty of at least 10$\mu\varepsilon$ and temperature uncertainty of at least 1° C. (degree Celsius). Systems that rely on measurements of birefringence in a polarization maintaining (PM) fiber (either using Brillouin scattering (see, References 21, 22, and 23) or Rayleigh scattering (see, Reference 24)) may be notable exceptions and may have achieved temperature (strain) uncertainties of ~10 m° C. (100 $n\varepsilon$). However, these systems may be limited to relatively short ranges (e.g., less than 100 m) and/or the use of PM fiber may be impractical in some applications. Finally, all of these systems may be limited to static and/or quasi-static applications with typical measurement times ranging from 1 second to several minutes. Meanwhile, techniques to enable dynamic and quasi-static measurements have been discussed, although existing systems may not provide sufficient temperature-strain discrimination (see, References 25, 26, and 27).

Considering the rapidly growing adoption of dynamic fiber sensors, such as distributed acoustic sensors (DAS), there is demand for temperature-strain discrimination systems capable of dynamic measurements with increased sensitivity.

SUMMARY OF THE INVENTION

This summary is intended to introduce in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

According to some embodiments of inventive concepts, methods may provide temperature measurements and strain measurements distributed along an optical fiber having a first end and a second end. According to such embodiments, a plurality of Brillouin pump laser pulses are coupled into a first end of the optical fiber, wherein each of the plurality of Brillouin pump laser pulses has a Brillouin pump frequency. Brillouin Stokes and Brillouin Anti-Stokes probe laser beams are coupled into the second end of the optical fiber, wherein the Brillouin Stokes probe laser beam has a Brillouin Stokes probe frequency, wherein the Brillouin Anti-Stokes probe laser beam has a Brillouin Anti-Stokes probe frequency, and wherein the Brillouin Stokes probe frequency, the Brillouin Anti-Stokes probe frequency, and the Brillouin pump frequency are included in a Brillouin frequency band. A plurality of Rayleigh seed pulses of a Rayleigh seed pulse train are coupled into the optical fiber, wherein each of the plurality of Rayleigh seed pulses of the Rayleigh seed pulse train has a respective different frequency included in a Rayleigh frequency band. Moreover, the Brillouin and Rayleigh frequency bands are mutually exclusive. Frequencies included in the Brillouin frequency band are coupled from the first end of the optical fiber to a Brillouin detector, and Rayleigh backscatter signals included in the Rayleigh frequency band are coupled from the optical fiber to a Rayleigh detector. The strain measurements and the temperature measurements at different positions distributed along the optical fiber are calculated based on outputs from the Brillouin detector and based on outputs from the Rayleigh detector. Accordingly, temperature strain discrimination may be provided by combining measurements of a Brillouin frequency shift and changes in a Rayleigh backscattered spectrum.

The plurality of Brillouin pump laser pulses may include first and second Brillouin pump laser pulses having orthogonal polarization states. The first and second Brillouin pump laser pulses are coupled into the first end of the optical fiber during a period of time between coupling an initial and a final of the Rayleigh seed pulses. Accordingly, each of the strain and temperature measurements is calculated for at least a portion of the period of time between coupling the initial and the final of the Rayleigh seed pulses.

In addition, a Brillouin Stokes local oscillator beam and a Brillouin Anti-Stokes local oscillator beam may be coupled into the second end of the optical fiber. The Brillouin Stokes local oscillator beam has a Brillouin Stokes local oscillator frequency offset from the Brillouin Stokes probe frequency, and the Brillouin Anti-Stokes local oscillator beam has a Brillouin Anti-Stokes local oscillator frequency offset from the Brillouin Anti-Stokes probe frequency. Moreover, the Brillouin Stokes local oscillator frequency and the Brillouin Anti-Stokes local oscillator frequency are included in the Brillouin frequency band.

According to some embodiments, the Brillouin Stokes local oscillator frequency is between the Brillouin Stokes probe frequency and the Brillouin pump frequency, and the Brillouin Anti-Stokes local oscillator frequency is between the Brillouin Anti-Stokes probe frequency and the Brillouin pump frequency. According to some other embodiments, the Brillouin Stokes probe frequency is between the Brillouin Stokes local oscillator frequency and the Brillouin pump frequency, and the Brillouin Anti-Stokes probe frequency is between the Brillouin Anti-Stokes local oscillator frequency and the Brillouin pump frequency.

Moreover, the Brillouin detector may include a Stokes photodetector and an Anti-Stokes photodetector, with frequencies including the Brillouin Stokes probe frequency and the Brillouin Stokes local oscillator frequency being coupled with the Stokes photodetector, and with frequencies including the Brillouin Anti-Stokes probe frequency and the Brillouin Anti-Stokes local oscillator frequency being coupled with the Anti-Stokes photodetector. Accordingly, the strain and temperature measurements may be calculated based on outputs from the Stokes and Anti-Stokes photodetectors.

The plurality of Brillouin pump laser pulses may interact with the Brillouin Stokes probe laser beam and the Brillouin Anti-Stokes probe laser beam in the optical fiber to stimulate Brillouin scattering in the optical fiber. Accordingly, coupling the frequencies included in the Brillouin frequency band may include coupling the Brillouin scattering from the first end of the optical fiber to the Brillouin detector.

Alternating ones of the plurality of Brillouin pump laser pulses may have orthogonal polarization states. Moreover, the plurality of Brillouin pump laser pulses and the Rayleigh seed pulses may be provided with a same repetition rate and a same pulse width. In addition, the plurality of Rayleigh seed pulses may be coupled into the first end of the optical fiber, and the Rayleigh backscatter signals may be coupled from the first end of the fiber to the Rayleigh detector.

Calculating the strain measurements and the temperature measurements may include calculating respective changes in Brillouin frequency shift corresponding to the different positions distributed along the optical fiber based on the outputs from the Brillouin detector. Respective changes in Rayleigh backscattered spectrum corresponding to the different positions distributed along the optical fiber may be calculated based on the outputs from the Rayleigh detector. The strain measurements and the temperature measurements at the different positions distributed along the optical fiber may be calculated based on the respective changes in Brillouin frequency shift at the different positions and the respective changes in Rayleigh backscattered spectrum at the different positions. Accordingly, temperature strain discrimination may be provided by combining measurements of a Brillouin frequency shift and changes in a Rayleigh backscattered spectrum.

The Brillouin Stokes probe frequency corresponds to a Brillouin stokes peak and may be shifted from the Brillouin pump frequency by the Brillouin frequency defined the optical fiber. The Brillouin Anti-Stokes probe frequency corresponds to a Brillouin anti-stokes peak and may be shifted from the Brillouin pump frequency by the Brillouin frequency defined by the optical fiber.

According to some other embodiments of inventive concepts, a sensor provides temperature measurements and strain measurements. The sensor includes an optical fiber having first and second ends, a Brillouin signal generator, a Rayleigh signal generator, a first coupler, a second coupler, a wavelength division multiplexer, a Brillouin detector, a Rayleigh detector, and a controller. The Brillouin signal generator is configured to generate a plurality of Brillouin pump laser pulses, a Brillouin Stokes probe laser beam, and a Brillouin Anti-Stokes probe laser beam. Each of the plurality of Brillouin pump laser pulses has a Brillouin pump frequency, the Brillouin Stokes probe laser beam has a Brillouin Stokes probe frequency, and the Brillouin Anti-Stokes probe laser beam has a Brillouin Anti-Stokes probe frequency. Moreover, the Brillouin Stokes probe frequency, the Brillouin Anti-Stokes probe frequency, and the Brillouin pump frequency are included in a Brillouin frequency band. The Rayleigh signal generator is configured to generate a plurality of Rayleigh seed pulses of a Rayleigh seed pulse train, each of the plurality of Rayleigh seed pulses of the Rayleigh seed pulse train has a respective different frequency included in a Rayleigh frequency band, and the Brillouin and Rayleigh frequency bands are mutually exclusive. The first coupler is configured to couple the plurality of Brillouin pump laser pulses and the plurality of Rayleigh seed pulses of a Rayleigh seed pulse train into the first end of the optical fiber. The second coupler is configured to couple the Brillouin Stokes and Brillouin Anti-Stokes probe laser beams into the second end of the optical fiber. The wavelength division multiplexer is coupled with the first coupler, and the first coupler is further configured to couple frequencies included in the Brillouin frequency band from the first end of the optical fiber to the wavelength division multiplexer and to couple Rayleigh backscatter signals included in the Rayleigh frequency band from the first end of the optical fiber to the wavelength division multiplexer. The Brillouin detector is coupled with the wavelength division multiplexer, and the wavelength division multiplexer is configured to couple the frequencies included in the Brillouin frequency band to the Brillouin detector. The Rayleigh detector is coupled with the wavelength division multiplexer, and the wavelength division multiplexer is configured to couple the Rayleigh backscatter signals included in the Rayleigh frequency band to the Rayleigh detector. The controller coupled with the Brillouin detector and the Rayleigh detector, and the controller is configured to calculate the temperature measurements and the strain measurements at different positions distributed along the optical fiber based on outputs from the Brillouin detector and based on outputs from the Rayleigh detector. Accordingly, temperature strain discrimination may be provided by combining measurements of a Brillouin frequency shift and changes in a Rayleigh backscattered spectrum.

The plurality of Brillouin pump laser pulses may include first and second Brillouin pump laser pulses having orthogonal polarization states. Moreover, the first and second Brillouin pump laser pulses may be coupled into the first end of the optical fiber during a period of time between coupling an initial and a final of the Rayleigh seed pulses. Accordingly, each of the strain and temperature measurements is calculated for at least a portion of the period of time between coupling the initial and the final of the Rayleigh seed pulses.

The Brillouin signal generator may be further configured to generate a Brillouin Stokes local oscillator beam and a Brillouin Anti-Stokes local oscillator beam. The Brillouin Stokes local oscillator beam has a Brillouin Stokes local oscillator frequency offset from the Brillouin Stokes probe frequency, and the Brillouin Anti-Stokes local oscillator beam has a Brillouin Anti-Stokes local oscillator frequency offset from the Brillouin Anti-Stokes probe frequency. The Brillouin Stokes local oscillator frequency and the Brillouin Anti-Stokes local oscillator frequency are included in the Brillouin frequency band. The second coupler may be further configured to couple a Brillouin Stokes local oscillator beam and a Brillouin Anti-Stokes local oscillator beam into the second end of the optical fiber.

According to some embodiments, the Brillouin Stokes local oscillator frequency is between the Brillouin Stokes probe frequency and the Brillouin pump frequency, and the Brillouin Anti-Stokes local oscillator frequency is between the Brillouin Anti-Stokes probe frequency and the Brillouin pump frequency. According to some other embodiments, the Brillouin Stokes probe frequency is between the Brillouin Stokes local oscillator frequency and the Brillouin pump frequency, and the Brillouin Anti-Stokes probe frequency is between the Brillouin Anti-Stokes local oscillator frequency and the Brillouin pump frequency.

The Brillouin detector may include a Stokes photodetector and an Anti-Stokes photodetector, and the wavelength division multiplexer may be further configured to couple frequencies including the Brillouin Stokes probe frequency and the Brillouin Stokes local oscillator frequency to the Stokes photodetector. The wavelength division multiplexer may be further configured to couple frequencies including the Brillouin Anti-Stokes probe frequency and the Brillouin Anti-Stokes local oscillator frequency to the Anti-Stokes photodetector. Moreover, the controller may be configured to calculate the temperature measurements and the strain measurements based on outputs from the Stokes and Anti-Stokes photodetectors.

The plurality of Brillouin pump laser pulses may interact with the Brillouin Stokes probe laser beam and the Brillouin Anti-Stokes probe laser beam in the optical fiber to stimulate Brillouin scattering in the optical fiber. The first coupler may be further configured to couple the Brillouin scattering from the first end of the optical fiber to the wavelength division multiplexer, and the wavelength division multiplexer may be further configured to couple the Brillouin scattering to the Brillouin detector.

Alternating ones of the plurality of Brillouin pump laser pulses may have orthogonal polarization states. Moreover, the plurality of Brillouin pump laser pulses and the Rayleigh seed pulses may be provided with a same repetition rate and a same pulse width.

The controller may be configured to calculate the temperature measurements and the strain measurements by calculating respective changes in Brillouin frequency shift corresponding to the different positions distributed along the optical fiber based on the outputs from the Brillouin detector. Respective changes in Rayleigh backscattered spectrum corresponding to the different positions distributed along the optical fiber may be calculated based on the outputs from the Rayleigh detector. The temperature measurements and the strain measurements at the different positions distributed along the optical fiber may be calculated based on the respective changes in Brillouin frequency shift at the different positions and the respective changes in Rayleigh backscattered spectrum at the different positions. Accordingly, temperature strain discrimination may be provided by combining measurements of a Brillouin frequency shift and changes in a Rayleigh backscattered spectrum.

The Brillouin Stokes probe frequency may corresponds to a Brillouin stokes peak and may be shifted from the Brillouin pump frequency by a Brillouin frequency defined by the optical fiber. The Brillouin Anti-Stokes probe frequency may correspond to a Brillouin anti-stokes peak and may be shifted from the Brillouin pump frequency by the Brillouin frequency defined by the optical fiber.

BRIEF DESCRIPTION OF DRAWINGS

Examples of embodiments of inventive concepts may be more clearly understood from the following detailed description taken in conjunction with the accompanying drawings in which:

FIG. 7A is a graph illustrating recovered strain (on the left axis) and recovered temperature (on the right axis) at the temperature stage of FIG. 1A according to some embodiments of inventive concepts as the temperature was shifted by 20 m° C. at about every 1.55 minutes.

DETAILED DESCRIPTION OF THE INVENTION

Figure 1A:
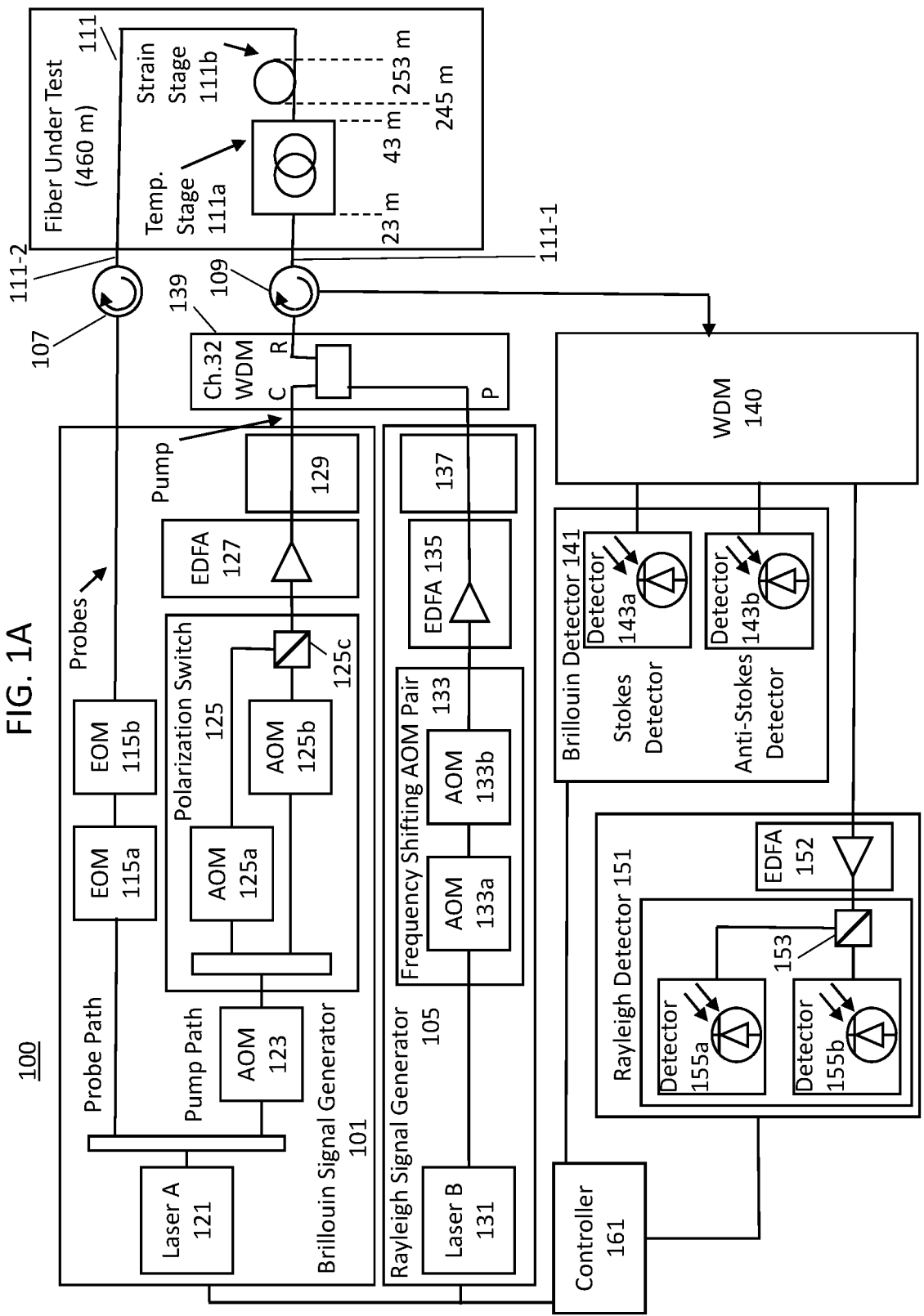
FIG. 1A is a schematic diagram illustrating a sensor according to some embodiments of inventive concepts.

Aspects and features of present inventive concepts will now be described more fully with reference to the accompanying drawings. The following description shows, by way of example, combinations and configurations in which aspects, features, and embodiments of inventive concepts can be put into practice. It will be understood that the disclosed aspects, features, and/or embodiments are merely examples, and that one skilled in the art may use other aspects, features, and/or embodiments or make functional and/or structural modifications without departing from the scope of the present inventive concepts. Moreover, the scope of present inventive concepts is not limited by these embodiments, and numerous variations, whether explicitly provided for by the specification or implied by the specification, may be implemented by one of skill in the art in view of this disclosure. Moreover, like reference numerals refer to like elements throughout.

The present disclosure presents embodiments of distributed fiber sensors capable of discriminating between temperature and strain with improved speed (>kHz) and/or accuracy while performing low-noise, dynamic measurements. This is achieved by leveraging recent advances in Brillouin and Rayleigh based fiber sensors. In particular, some embodiments of present inventive concepts provide a hybrid sensor that combines slope-assisted Brillouin optical time domain analysis (BOTDA) and Rayleigh-scattering-based frequency scanning optical time domain reflectometry (OTDR) sharing a single mode optical fiber to make low noise measurements of the Brillouin and Rayleigh frequency shifts. The Brillouin frequency shift and the frequency shift of the Rayleigh backscattering are used to efficiently distinguish between temperature and strain in the same optical fiber while providing low noise measurements. These subsystems combine state-of-the-art sensitivity with the ability to perform both dynamic and quasi-static measurements. According to some embodiments, this enables a hybrid system capable of temperature/strain discrimination with a quasi-static temperature resolution of 15 m° C. and a strain resolution of 130 nε (nanostrain) along a 500 meter length of single mode fiber with 5 meter spatial resolution. In contrast to previously reported techniques, some embodiments of this approach may also enable dynamic measurements with a bandwidth of 1.7 kHz and temperature (strain) noise spectral density of 0.52 m° C./√Hz (4.6 nε/√Hz) while suppressing temperature/strain cross-sensitivity by at least 25 dB. This represents a dramatic improvement in measurement speed and sensitivity compared with existing techniques capable of temperature/strain discrimination in standard single mode fiber.

According to some embodiments, slope-assisted techniques obtain the Brillouin frequency shift from a single measure of the Brillouin gain. By using the Brillouin phase as well as the gain, a more accurate measure of the Brillouin frequency may be provided. Moreover, combining information from the Stokes as well as the anti-Stokes peaks may enable measurements with increased immunity to laser frequency noise and instrument phase noise.

Some embodiments of the present disclosure provide systems and methods capable of dynamic temperature/strain discrimination in a standard single mode fiber. This system leverages recent advances in slope-assisted Brillouin optical time domain analysis (SA-BOTDA) (see, Reference 17), which enable dynamic measurements of the Brillouin frequency shift BFS with reduced susceptibility to noise and/or cross-talk which may have been common in early SA-BOTDA architectures (see, Reference 28). According to some embodiments, an SA-BOTDA system is integrated with a low-noise Rayleigh-scattering system based on a frequency-scanning optical time domain reflectometry (FS-OTDR) architecture (see, References 29, 30, and 31). In contrast to Rayleigh-based phase-measuring φ-OTDR systems (see, Reference 32), FS-OTDR may provide increased long-term stability that may be useful/required for quasi-static measurements. This hybrid Brillouin/Rayleigh system may enable both dynamic and quasi-static discrimination between temperature and strain with a measurement bandwidth of 1.7 kHz and/or a cross-sensitivity below −25 dB. Some embodiments may demonstrate a temperature uncertainty of 0.52 m° C./√Hz and/or a strain uncertainty of 4.6 nε/√Hz at a range of 500 meters with 5 meter spatial resolution. This improvement (compared with existing temperature/strain discrimination systems) may enable new applications and/or reduce measurement artifacts due to cross-sensitivity in distributed acoustic sensor DAS systems.

Operating principles are discussed below according to some embodiments of inventive concepts.

A hybrid sensor according to some embodiments is designed to record changes in the Brillouin frequency shift (BFS), $\Delta f_B$, and frequency shifts in the Rayleigh backscattered spectrum, $\Delta f_R$. Since these measurands have different dependencies on temperature and strain, they can be used for discrimination (see, Reference 16) to determine both distributed temperature and distributed strain across the length of a single optical fiber. The coupled algebraic equation that describes how the two measurands depend on changes in temperature $\Delta T$ and strain $\Delta \varepsilon$ is:

$$\begin{bmatrix} \Delta f_B \\ \Delta f_R \end{bmatrix} = C \begin{bmatrix} \Delta T \\ \Delta \varepsilon \end{bmatrix}, \quad \text{equation (1)}$$

where C is a matrix of coefficients describing the response of $\Delta f_B$ and $\Delta f_R$ to temperature and strain:

$$C = \begin{bmatrix} C^T_{\Delta f_B} & C^{\varepsilon_f}_{\Delta f_B} \\ C^T_{\Delta f_R} & C^{\varepsilon}_{\Delta f_R} \end{bmatrix}. \quad \text{equation (2)}$$

The unique solution to calculate changes in temperature and strain is given by:

$$\begin{bmatrix} \Delta T \\ \Delta \varepsilon \end{bmatrix} = C^{-1} \begin{bmatrix} \Delta f_B \\ \Delta f_R \end{bmatrix}, \quad \text{equation (3)}$$

if and only if the det C≠0 (i.e., the determinant of the matrix C is not equal to zero). This constraint reflects the requirement that the two measurands have distinct responses to temperature and strain.

Sensor Design is discussed below according to some embodiments of inventive concepts.

Distributed Brillouin and Rayleigh sensors have both advanced considerably in recent years. State-of-the-art Brillouin sensors are increasingly capable of low-noise dynamic measurements while advances in Rayleigh sensors have enabled quantitative strain-sensing with the long-term stability that may be useful/required for continuous temperature/strain discrimination. However, previous temperature/strain discrimination techniques have not taken full advantage of these advances.

Some embodiments of inventive concepts may use a slope-assisted Brillouin optical time domain analysis SA-BOTDA architecture capable of providing low-noise, dynamic measurements of the BFS (see, Reference 17). While early SA-BOTDA systems may have been susceptible to laser intensity noise, frequency noise, and/or cross-talk due to effects such as pump-depletion, many/most of these issues have been addressed. For example, researchers have shown that measuring the phase-to-gain ratio (as opposed to direct gain measurements) may provide improved linearity along with immunity to pump power fluctuations (see, References 33 and 34), while combining information from the Stokes and anti-Stokes interactions may provide increased immunity to laser frequency noise (see, Reference 17). Techniques based on probe frequency-modulation have also been introduced to increase the dynamic range of SA-BOTDA systems (see, References 35 and 36). Despite these advances, SA-BOTDA systems have not been applied to temperature/strain discrimination.

To measure shifts in the Rayleigh backscattering spectrum, some embodiments of inventive concepts may use a frequency-scanning OTDR scheme (see, Reference 29). This approach may enable longer-range sensing than most optical frequency domain reflectometry (OFDR) systems (see, Reference 37), while providing excellent long-term stability. This is in contrast to phase-measuring φ-OTDR schemes which may be limited to dynamic measurements since they may need to constantly track the backscattered phase to reduce/avoid unwrapping errors (see, Reference 32). Moreover, rapid frequency scanning may enable dynamic strain measurements using FS-OTDR (see, References 30 and 31), although the bandwidth may be reduced from the limit imposed by the round-trip time in the fiber. To maintain an increased/maximum bandwidth, chirped pulse OTDR techniques have been introduced (see, References 38 and 39). These techniques may be adopted in future applications to provide increased sensor bandwidth, although higher frequency modulation and detection electronics may also be useful/required.

FIG. 1A is schematic diagram illustrating a hybrid sensor 100 according to some embodiments of inventive concepts. The SA-BOTDA components are indicated as Brillouin signal generator 101 and Brillouin detector 141, while the FS-OTDR components are indicated as Rayleigh signal generator 105 and Rayleigh detector 141.

Figure 1B:
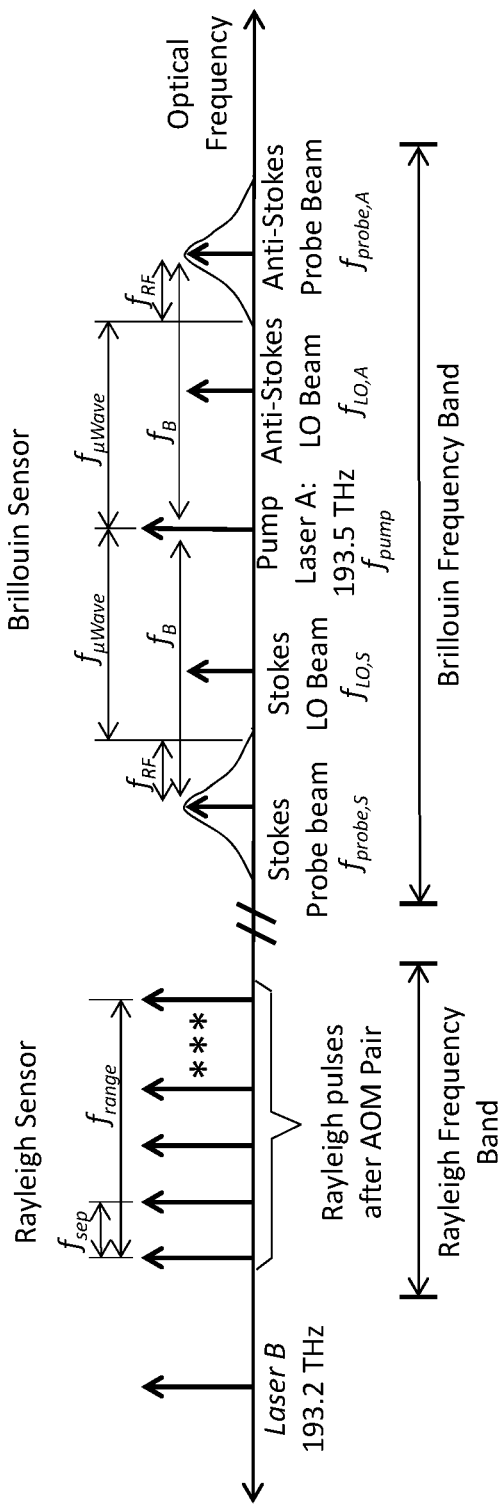
FIG. 1B is a frequency diagram illustrating laser signals used in the sensor of FIG. 1A according to some embodiments of inventive concepts.

As shown in embodiments of FIG. 1A, the hybrid Brillouin/Rayleigh sensor 100 may include an optical fiber 111 (shown as a fiber under test or FUT). For purposes of discussion/demonstration, optical fiber 111 may be 460 meters long with a 20 m section of fiber 111 being provided on temperature-control stage 111a and with an 8-meter section of fiber 111 being wrapped on strain stage 111b (provided using a cylindrical piezoelectric material, such as, a piezoelectric ceramic material, e.g., lead zirconate titanate PZT). Note that 100 GHz wide filters 129 and 137 may be inserted after each of EDFAs 127 and 135 to suppress amplified spontaneous emission. FIG. 1B is a frequency diagram showing relative frequencies of laser probes used in the Brillouin and Rayleigh sensor systems.

It will be understood that the temperature-control stage 111a and the strain stage 111b are provided for purposes of illustration and demonstration. Temperature-control and strain stages, however, would be omitted in actual applications where optical fiber 111 is used to provide distributed strain measurements and temperature measurements over a length thereof. More particularly, in an actual application, fiber 111 would be provided in/on a structure for which strain and temperature measurements are desired. For example, optical fiber 111 may be provided on/in and a structure to be monitored (e.g., an airframe or wing of an airplane, a hull of a ship, a wall or support of a building, etc.) such that sensor 100 is used to measure temperature and strain at portions of the structure distributed along the optical fiber 111.

The Brillouin Sensor Design of FIG. 1A is discussed below with respect to the optical frequency diagram of FIG. 1B.

In embodiments of FIG. 1A, the SA-BOTDA system includes a Brillouin signal generator 101 seeded with a low-noise laser 121 shown as Laser A (<kHz linewidth) operating at 193.5 THz (ITU Channel 35), and laser 121 is used to seed both probe and pump paths of the SA-BOTDA system. In the pump path, a −100 MHz acousto-optic modulator (AOM) 123 is driven with a frequency burst to generate 50 ns laser pulses at a 200 kHz repetition rate (selected to probe up to 500 m of fiber with 5 meter spatial resolution). A repetition rate of the laser pulses from AOM 123 is set based on a round trip time through optical fiber 111.

Particular lengths of fiber 111 (e.g., 500 meters) and spatial resolutions (e.g., 5 meters) are discussed by way of example, but other lengths and spatial resolutions may be implemented. According to some embodiments of inventive concepts, sensor 100 may provide distributed measurements of temperature and strain using a fiber 111 of at least 100 meters in length and may provide spatial resolutions of 5 meters or less. With a 500 meter length of fiber 111 and a 5 meter resolution, for example, sensor 100 may thus be able to provide both temperature and strain measurements for each 5 meter segment of fiber 111 to provide 100 separate temperature measurements and 100 separate strain measurements. Stated in other words, the number of measurements of temperature and the number of measurements of strain can be determined by dividing the length of fiber 111 by the resolution.

The laser pulses from AOM 123 (at optical frequency $f_{LaserA}$) are directed into polarization switch 125 which includes a pair of +100 MHz AOMs 125a and 125b and a polarizing beam splitter (PBS) 125c. Polarization switch 125 is designed such that alternating pulses have orthogonal polarization states to compensate for polarization fading along optical fiber 111 (see, Reference 40). The pulses from polarization switch 125 may be amplified to a peak power of 840 mW using Er-doped fiber amplifier (EDFA) 135 and filtered using filter 137 before being directed into wavelength division multiplexer (WDM) 139 where the pump pulses are combined with Rayleigh seed pulses from Rayleigh signal generator 105. After multiplexing, the Brillouin pump pulses and Rayleigh seed pulses from WDM 139 are then coupled through circulator 109 into a first end of optical fiber 111. Since one measurement may require information from both polarization states, the measurement rate for the SA-BOTDA system was 100 kHz, corresponding to a Nyquist bandwidth of 50 kHz. In examples discussed herein with respect to FIG. 1B, the frequency of $f_{LaserA}$ is 193.5 THz.

In the probe path of Brillouin signal generator 101, a pair of electro-optic modulators (EOM) 115a and 115b is used to generate two probe beams (i.e., a Stokes probe beam at frequency $f_{probe,S}$ and an Anti-Stokes probe beam at frequency $f_{probe,A}$) and corresponding local oscillator beams at frequencies offset from the probe beams (i.e., Stokes local oscillator LO beam at frequency $f_{LO,S}$ and Anti-Stokes local oscillator LO beam at frequency $f_{LO,A}$) at respective optical frequencies (i.e., $f_{probe,S}$, $f_{probe,A}$, $f_{LO,S}$, and $f_{LO,A}$). The first EOM 115a is driven with $f_{\mu wave}$—10.8 GHz and the second EOM 115b is driven with $f_{RF}$=100 MHz. The resulting probe beams include a pair of probe beams at the Stokes and anti-Stokes frequencies ($f_{probe,S}$, $f_{probe,A}$) and a pair of co-propagating local oscillator (LO) beams with LO frequencies ($f_{LO,S}$, $f_{LO,A}$) near the probe frequencies, as shown in FIG. 1B. Note that the subscripts "S" and "A" refer to the Stokes and Anti-Stokes frequencies, respectively. The LO beams are shifted sufficiently (e.g., by 100 MHz) relative to the probe beams to reduce/avoid interaction with the Stokes or anti-Stokes gain peaks ($|f_{probe,S(A)}-f_{LO,S(A)}|\gg\Gamma_B$, where $\Gamma_B$ is the Brillouin linewidth of ~30 MHz in optical fiber 111). According to embodiments illustrated in FIGS. 1A and 1B, $f_{LO,S}=f_{probe,S}$+100 MHz, and $f_{LO,A}=f_{probe,A}$−100 MHz, such that $f_{probe,S}<f_{LO,S}<$193.5 THz and 193.5 THz$<f_{LO,A}<f_{probe,A}$. According to some other embodiments, $f_{LO,S}=f_{probe,S}$−100 MHz, and $f_{LO,A}=f_{probe,A}$+100 MHz, such that $f_{LO,S}<f_{probe,S}<$193.5 THz and 193.5 THz$<f_{probe,A}<f_{LO,A}$.

The probe and local oscillator beams are coupled through circulator 107 into a second end of optical fiber 111. After passing through optical fiber 111, frequencies $f_{probe,S}$, $f_{probe,A}$, $f_{LO,S}$, and $f_{LO,A}$ of the probe and local oscillator beams are coupled from the first end of optical fiber 111 to WDM 140 via circulator 109 where the Stokes and anti-Stokes frequencies are separated and each pair of probe and LO beam frequencies is directed to separate photodetectors 143a and 143b of Brillouin detector 141.

According to some embodiments of inventive concepts, controller 161 includes processor 163 (also referred to as processing circuitry), memory 165 (also referred to as memory circuitry), and communication interface 167. Controller 161 is configured to receive outputs from Brillouin detector 141 and from Rayleigh detector 151 through communication interface 167, and processor 163 is configured to perform operations discussed herein to calculate temperature and strain measurements distributed over optical fiber 111 based on the outputs from Brillouin and Rayleigh detectors received through communication interface 167. Processor 163 is coupled with memory 165, and memory 165 may include computer readable program code that when executed by the processor 163 causes the processor to perform operations according to embodiments disclosed herein. Accordingly, processor 163 may execute computer readable program code of memory 165 to perform operations as disclosed herein. According to other embodiments, processor 163 may be defined to include memory so that separate memory is not required.

Controller 161 receives the interference signals at 1 GS/s through communication interface 167, and processor 163 digitizes the interference signals at 1 GS/s and performs quadrature I/Q demodulation to recover the amplitude $A_{meas,S(A)}$ and phase $\theta_{meas,S(A)}$ of the respective probe beams. Processor 163 calculates the Brillouin gain $G_{SBS,S(A)}$ and phase $\phi_{SBS,S(A)}$ using a reference measurement of the amplitude, $A_{ref,S(A)}$, and phase, $\theta_{ref,S(A)}$, which were recorded without the pump pulses using the following equations:

$$G_{SBS,S(A)} = \ln[A_{meas,S(A)}/A_{ref,S(A)}], \quad \text{equation (4a)}$$

$$\phi_{SBS,S(A)} = \theta_{meas,S(A)} - \theta_{ref,S(A)}, \quad \text{equation (4b)}$$

To extract $\Delta f_B$, processor 163 combines the Brillouin gain and phase (see, Reference 17) as follows:

$$\Delta f_B = -\frac{\Gamma_B}{2} \cdot \left[\frac{\phi_{SBS,S} + \phi_{SBS,A}}{G_{SBS,S} + G_{SBS,A}}\right], \quad \text{equation (5)}$$

Figure 2A:
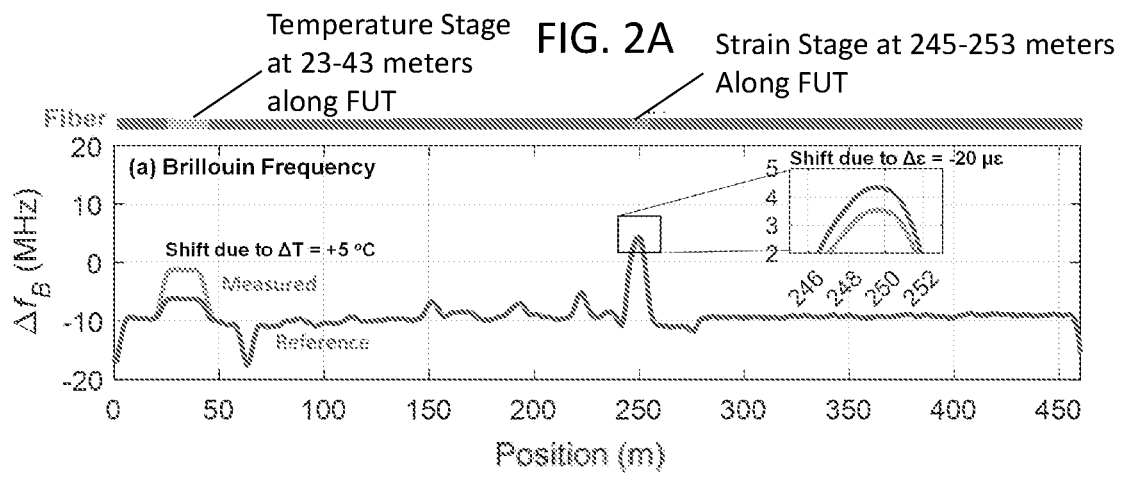
FIG. 2A is a graph illustrating measured Brillouin frequency shifts at each position along the optical fiber of FIG. 1A at two different temperature/strain conditions according to some embodiments of inventive concepts.

By combining the gain and phase in this way, controller 161 may provide a single shot measurement of the BFS with increased immunity to laser frequency fluctuations, instrumentation phase noise, pump power fluctuations, and/or interference from pump depletion. FIG. 2(a) shows an example of measurements of the BFS at each position along fiber 111 (including the portion from 23-43 meters at the temperature stage and the portion from 245 meters to 253 meters at the strain stage).

The Rayleigh Sensor Design of FIG. 1A is discussed below with respect to the optical frequency diagram of FIG. 1B.

According to some embodiments of inventive concepts, the Rayleigh-based FS-OTDR system of FIG. 1A is designed to record the Rayleigh backscattering (RBS) spectrum that results from sequentially launching pulses at different optical frequencies (see, References 29 and 31). This provides a measurement of the RBS spectrum at each position in the fiber. Changes in temperature or strain at a given position in the fiber introduce a linear shift in the RBS spectrum, $\Delta f_R$, which can be obtained via cross-correlation between the measured spectrum and a reference spectrum recorded at a known temperature and strain state.

The FS-OTDR system includes a Rayleigh signal generator 105 seeded with a narrow linewidth (e.g., <1 kHz) laser 131 shown as Laser B with optical frequency $f_{LaserB}$. In examples discussed below with respect to FIG. 1B, Laser B has an optical frequency $f_{LaserB}$ of 193.2 THz (ITU Channel 32). The frequency $f_{LaserB}$ of Laser B is sufficiently shifted from the frequency $f_{LaserA}$ such that the resulting light can be separated by WDM 140. The seed laser from Laser B 131 is directed to a pair 133 of +200 MHz AOMs 133a and 133b, which may serve two purposes. First, the AOMs 133a and 133b carve 50 ns pulses at a 200 kHz repetition rate to match the spatial resolution and sensing range of the SA-BOTDA system including Brillouin signal generator 101 and Brillouin detector 141. Accordingly, AOMs 133a and 133b carve pulses with the same durations as that of the Brillouin pump pulses to match spatial resolutions of the SA-BOTDA and FS-OTDR systems, and the pulse repetition rate is set by the round-trip time through optical fiber 111. Second, the AOMs 133a and 133b are used to sweep the frequency of the interrogation pulses. Each AOM 133a and 133b is driven at frequencies ranging from 170 MHz to 225 MHz in steps of 1 MHz. This results in a train of pulses with frequencies spread over $f_{range}$=110 MHz in steps of $f_{sep}$=2 MHz. AOMs 133a and 133b are thus driven with different frequencies in a round robin format so that sequential pulses have increasing optical frequency. Note that the drive voltage applied to the AOMs 133a and 133b is adjusted to maintain a uniform amplitude over all frequencies. FIG. 1B shows the relevant frequencies generated by Rayleigh signal generator 105. The frequency-shifted pulse train from frequency shifting AOM pair 133 is amplified by EDFA 135 to a peak power of ~1.8 W. 100 GHz filter 137 may be inserted after EDFA 135 to suppress amplified spontaneous emission. The Rayleigh seed pulses are combined with the Brillouin pump using WDM 139 before coupling through circulator 109 into the first end of optical fiber 111.

The Rayleigh Backscattered (RBS) light (resulting from the sequential pulses generated by AOM Pair 133 and EDFA 135) is directed from the first end of fiber 111 through circulator 109 to WDM 140 where it is separated from the Brillouin probe and local oscillator beams and directed to Rayleigh detector 151 (including EDFA 152, polarization diversity receiver 153, and detectors 155a and 155b). The RBS light is then amplified by EDFA 152 and directed to polarization diversity receiver 152 from which the RBS light is recorded on a pair of detectors 155a and 155b. The signals from detectors 155a and 155b are received by controller 161 through communication interface 167 and combined by processor 163 using the root sum squared method (see, Reference 41). A complete measurement of the RBS spectrum at each position in the fiber is provided by processor 163 after recording the RBS pattern generated by each of the 56 Rayleigh seed pulses at the respective frequencies. A shift in the RBS is then recovered for each position in optical fiber 111 via cross-correlation with a reference measurement.

Figure 2B:
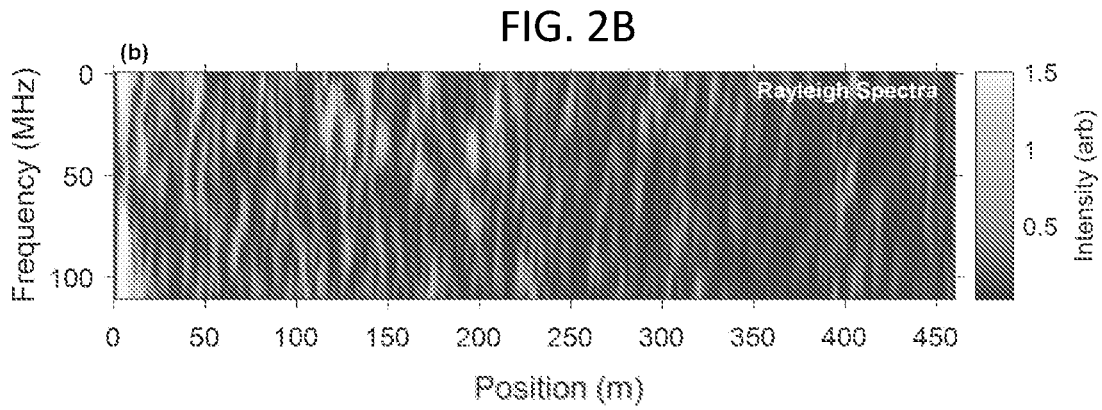
FIG. 2B illustrates an example of Rayleigh backscatter spectra at each position along the optical fiber of FIG. 1A according to some embodiments of inventive concepts.
Figure 2C:
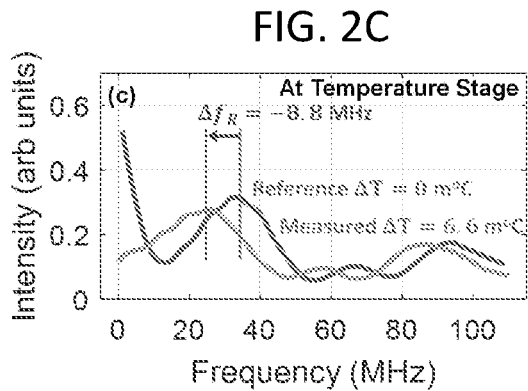
FIG. 2C is a graph illustrating Rayleigh backscatter spectra at the temperature stage of FIG. 1A collected at two different temperatures according to some embodiments of inventive concepts.
Figure 2D:
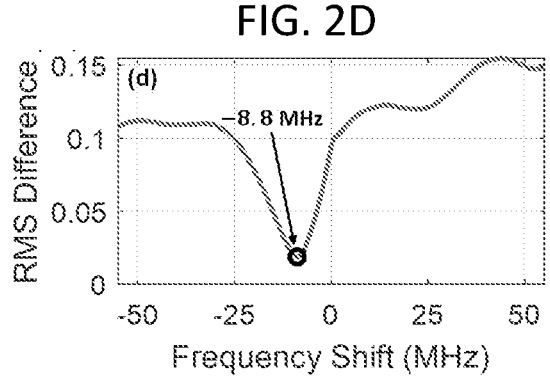
FIG. 2D is a graph illustrating a root mean squared difference between shifted versions of the spectra shown in FIG. 2C according to some embodiments of inventive concepts, where the Rayleigh frequency shift is obtained from the minimum of the plot of FIG. 2D.

FIG. 2B shows an example of measurements of the RBS spectrum at each position along optical fiber 111. After each measurement of this type, a shift in the RBS spectrum is extracted at each position by comparing the measured spectrum with a reference spectrum recorded at a known temperature/strain state. A cross-correlation approach (see, Reference 29) may introduce artifacts (see, Reference 42), particularly when the spectrum only has a few features (in this case due to a limited frequency scanning range of AOMs 133a and 133b). As a result, processor 163 extracts the shift in the spectrum by reducing/minimizing the root-mean square (RMS) difference between the reference spectrum and the currently measured spectrum:

$$\Delta f_R(z) = \underset{\Delta f_R}{\mathrm{argmin}}\left[\sqrt{\sum_f (RBS_{ref}(z, f) - RBS_{meas}(z, f + \Delta f_R))^2}\right], \quad \text{equation (6)}$$

where $RBS_{ref}$ is the reference RBS spectrum recorded at position z and $RBS_{meas}$ is the currently measured RBS spectrum. Note that the RBS spectra are interpolated to improve the measurement resolution. An example of the interpolated reference spectrum and measured spectrum is shown in FIG. 2C. The corresponding RMS difference is shown in FIG. 2D. Lastly, note that the reference spectrum is allowed to "expand", following the technique proposed in Reference 31. This may enable a wide dynamic range, as will be discussed below.

The FS-OTDR measurement bandwidth is set in the system of FIGS. 1A and 1B based on the time required to record the RBS spectrum produced by 56 Rayleigh seed pulse frequencies. Since the Rayleigh seed pulses were injected at a rate of 200 kHz, a measurement of the RBS spectrum was obtained every 290 μs (including 10 μs of "dead-time" to allow the drive electronics to reset). Therefore, the Rayleigh system had a measurement rate of approximately 3.45 kHz (i.e., 1/290 μs) and a Nyquist sensing bandwidth of 1.7 kHz. A maximum sensing bandwidth for the combined temperature-strain measurement may thus be limited by the Rayleigh measurement rate. The FS-OTDR sensor bandwidth may be further improved in the future via frequency-multiplexing and/or by adopting a chirped-pulse OTDR scheme (see, Reference 19).

FIG. 2A illustrates measured BFS at each position along the test fiber 111 (having a length of 460 meters) at two different temperature/strain conditions respectively applied using temperature stage 111a to provide a change in temperature ($\Delta T$) of +5 degrees C. (affecting a 20 meter segment of 460 meter long fiber 111 between positions at 23 meters and 43 meters) and using strain stage 111b to apply a change in strain ($\Delta\varepsilon$) of $-20\mu\varepsilon$ (affecting an 8 meter segment of 460 meter long fiber 111 between positions at 245 meters and 253 meters). FIG. 2B illustrates an RBS spectra at each position along test fiber 111. FIG. 2C illustrates an RBS spectra at the temperature stage 111a collected at two temperatures, and FIG. 2D illustrates the RMS difference between shifted versions of the spectra shown in FIG. 2C. The Rayleigh frequency shift is obtained from the minimum of this plot.

Test Fiber 111 with the 460 meter length is discussed below.

Figure 1C:
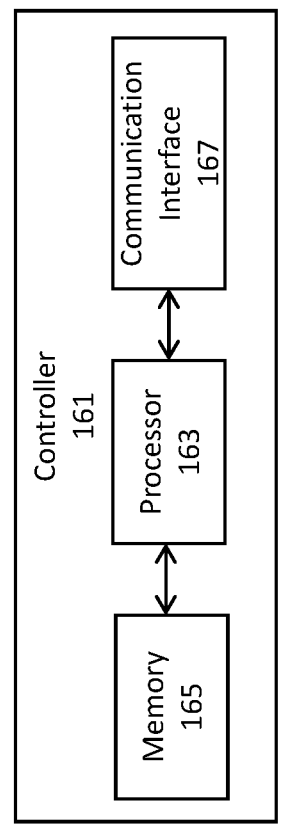
FIG. 1C is a block diagram illustrating the controller of FIG. 1A according to some embodiments of inventive concepts.

In embodiments of FIGS. 1A-C, test fiber 111 (also referred to as fiber under test or FUT) includes several sections of Corning SMF28e+ fiber with a total length of 460 m. To test the ability of the system to discriminate between temperature and strain, a 20 m section of fiber 111 is placed on a temperature control stage 111a at about 23 m into fiber 111, and an 8 meter section of fiber 111 is wrapped on a piezo electric cylinder (PZT) at about 245 m into the FUT. The upper right portion of FIG. 1A illustrates a schematic representation of the FUT. FIG. 2A illustrates a measurement of the BFS at each position along the fiber at two different temperature/strain conditions (shown at positions between 23 and 43 meters and between 245 and 253 meters). The temperature was increased by 5 degrees C. at the temperature stage, resulting in an increase in the Brillouin frequency while the strain was decreased by $20\mu\varepsilon$ at the strain stage, resulting in a decrease in the Brillouin frequency (see inset in FIG. 2A). The baseline variations in the Brillouin frequency at other positions in fiber 111 were primarily due to residual strain in the FUT.

Calibration of Coefficients are discussed below.

After measuring $\Delta f_B$ and $\Delta f_R$, processor 163 recovers the temperature and strain using Equation (3). The coefficients used in matrix C are provided below in Table 1. The Brillouin coefficients were obtained through a series of calibration measurements since the response of the BFS to temperature and strain can vary depending on a number of fiber-specific parameters including the fiber composition, density, refractive index, and structure (see, References 43 and 44).

The Rayleigh-based coefficients were determined from fundamental fiber constants and the laser frequency $v_0 = \theta_{LaserB}$ (see, Reference 45):

$$C_{\Delta f_R}^{T} = -(\rho_T + c_T)v_0, \qquad \text{equation (6a)}$$

$$C_{\Delta f_R}^{\varepsilon} = -(1 + c_\varepsilon)v_0, \qquad \text{equation (6b)}$$

where $\rho_T$ is the thermal expansion coefficient, $c_T$ is the thermo-optic coefficient, and $c_\varepsilon$ is the elasto-optic coefficient. For example, $\rho_T + c_T \cong 6.92 \times 10^{-6\circ}$ C.$^{-1}$ and $1+c_\varepsilon \cong 0.78\varepsilon^{-1}$ (see, References 29 and 51). The coefficients for the frequency shift of the RBS spectrum based on Equations (6a) and (6b) and $v_0=193.2$ THz are shown below in Table 1. The Brillouin coefficients were obtained using a series of calibration measurements that recorded the Brillouin frequency shift due to known changes in temperature or strain.

TABLE 1

Temperature and Strain Coefficients

| | | | |
|---|---|---|---|
| $C_{\Delta f_B}^{T}$ | 0.954 MHz/° C. | $C_{\Delta f_B}^{\varepsilon}$ | 45.8 kHz/$\mu\varepsilon$ |
| $C_{\Delta f_R}^{T}$ | $-1.26$ GHz/° C. | $C_{\Delta f_R}^{\varepsilon}$ | $-152$ MHz/$\mu\varepsilon$ |

Basic Sensor Operation is discussed below.

Advantages of this technique are discussed below with respect to sensor 100 of FIG. 1A. For the tests discussed below, the Brillouin and Rayleigh systems were set to generate 50 ns pulses, providing 5 meter spatial resolution. Sensor 100 was designed to probe the 460 meter optical fiber 111, and the pulse repetition rate was thus set for both systems to 200 kHz. Since a measurement using the Brillouin system probes the system using two polarization states, the Brillouin system has an effective measurement rate of 100 kHz and a Nyquist sensing bandwidth of 50 kHz. In this embodiment, the Rayleigh system interrogated optical fiber 111 with a pulse train having $N_{freq}=56$ different frequencies with 2 MHz spacing over a 110 MHz range. Since one frequency enters the fiber at a time from the Rayleigh system, measurements of the RBS pattern are obtained from all 56 frequencies every 290 µs (including 10 µs of "deadtime" to allow the drive electronics to reset). Therefore, the Rayleigh system has a measurement rate of approximately 3.45 kHz (i.e. 1/290 µs) and a Nyquist sensing bandwidth of 1.7 kHz. This Rayleigh measurement rate determines a maximum sensing bandwidth for the combined temperature and strain measurements.

Figures 3A, 3B:
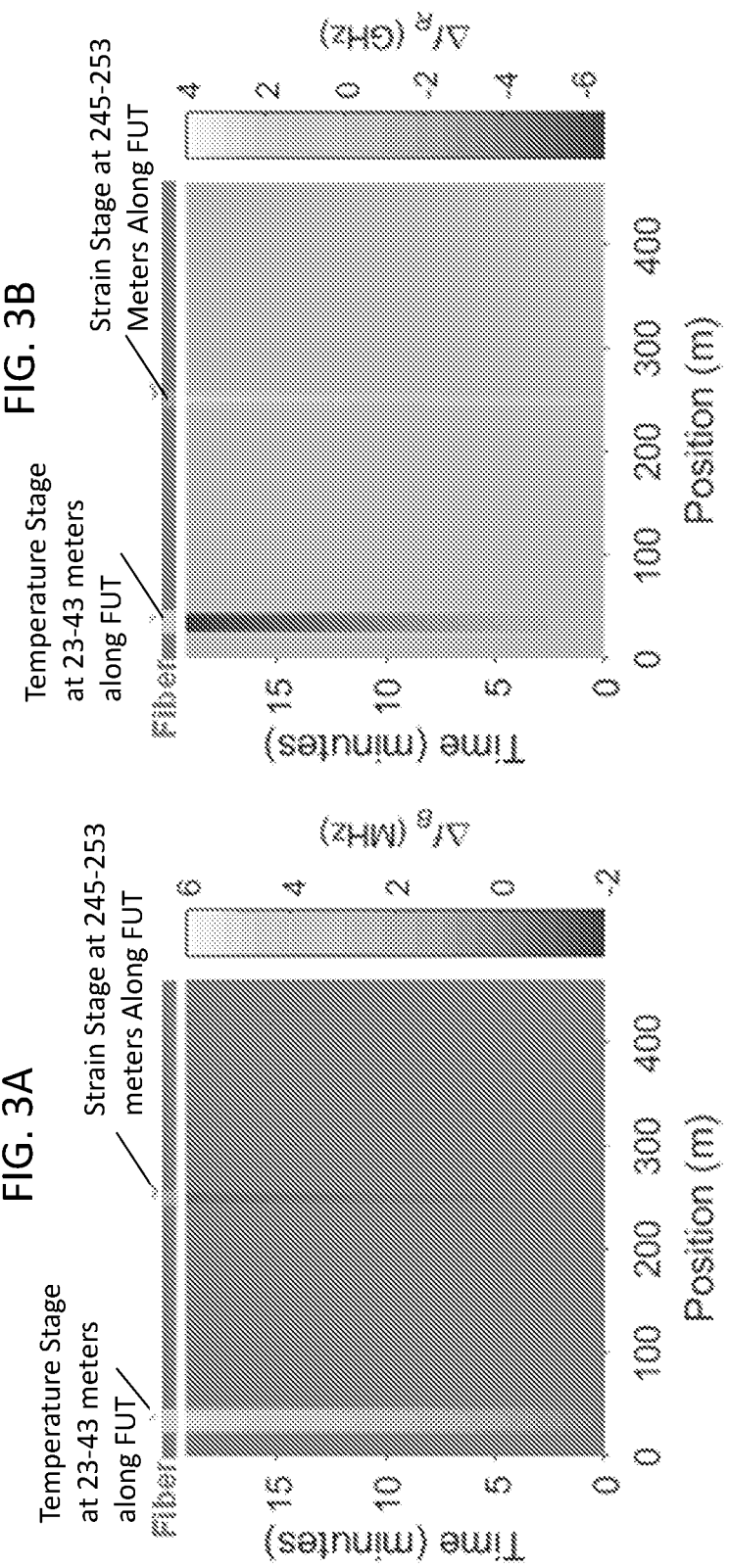
FIG. 3A illustrates a measured change in the Brillouin frequency from the sensor of FIG. 1A as the temperature at the temperature stage was increased by 5° C. and the strain at the strain stage was decreased by 20µε according to some embodiments of inventive concepts.
FIG. 3B illustrates a measured change in the Rayleigh frequency shift as the temperature at the temperature stage was increased by 5° C. and the strain at the strain stage was decreased by 20με according to some embodiments of inventive concepts.
Figure 3C:
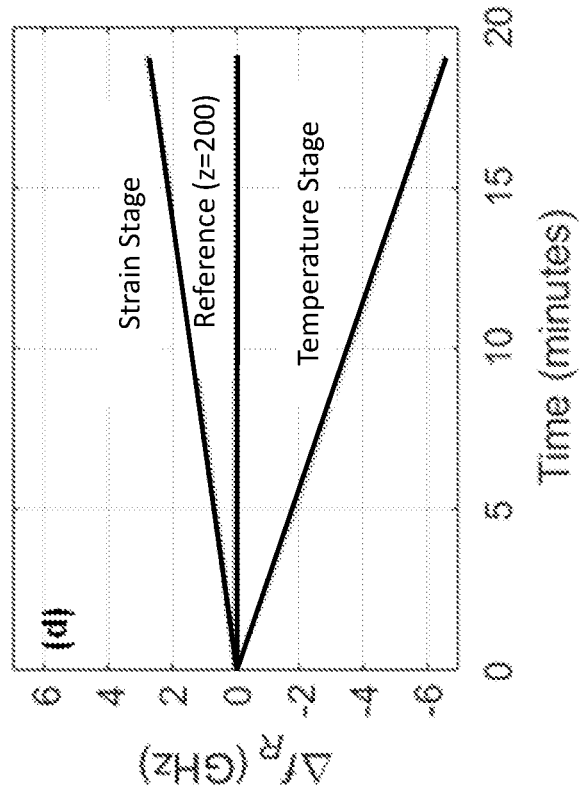
FIG. 3C is a graph illustrating the measured change in the Brillouin frequency at the temperature stage, at the strain stage, and at a reference location according to some embodiments of inventive concepts.
Figure 3D:
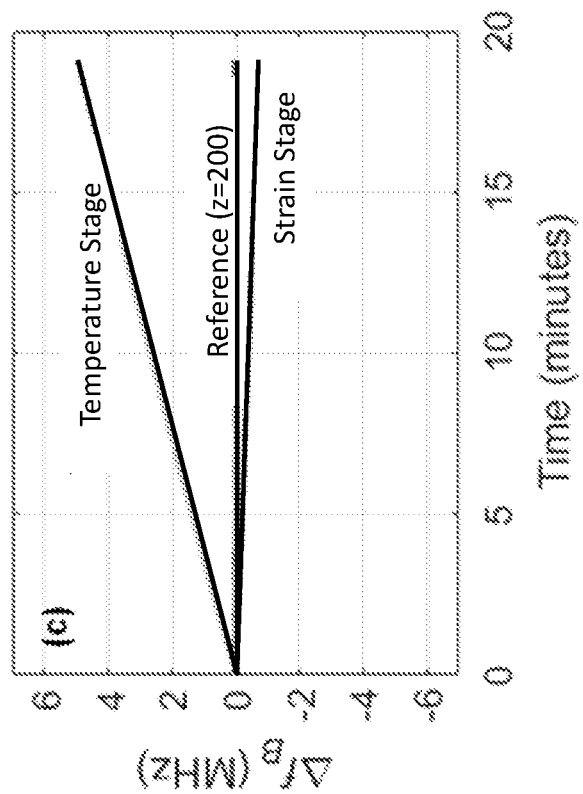
FIG. 3D is a graph illustrating the measured change in the Rayleigh frequency shift at the temperature stage, at the strain stage, and at a reference location according to some embodiments of inventive concepts.

As a demonstration, the temperature of the 20 meter segment of optical fiber 111 on temperature stage 111a was increased by approximately 5° C. over about 20 minutes while the strain on the 8 meter segment of optical fiber 111 on strain stage 111b was decreased by approximately $20\mu\varepsilon$ over the same time period. FIG. 3A illustrates the measured change in $\Delta f_B$ along fiber 111 as the temperature and strain were changed, and FIG. 3B illustrates the measured change in $\Delta f_R$ over the same time period as the temperature and strain were changed. FIGS. 3C and 3D illustrate the measured BFS and Rayleigh frequency shift at temperature stage 111a, at strain stage 111b, and at a reference position (200 m into fiber) where the environmental conditions were nominally unchanged. As expected the Brillouin and Rayleigh sensors both respond to changes in temperature and strain on the two stages, while the frequency shift in the rest of the fiber remained unchanged. These measurements highlight the cross-sensitivity of the individual sensor platforms to changes in temperature and strain. The differential responses of the two sensor platforms (useful/required for efficient temperature/strain discrimination) is also evident from the different slopes in FIGS. 3C and 3D. These measurements also highlight the dynamic ranges of the sensors. In particular, the Rayleigh sensor tracked a shift in the Rayleigh frequency of about 6 GHz, compared to the frequency scan range of 110 MHz. This confirmed the ability of the system to construct an expanding reference pattern during the measurement. This measurement was also well within the dynamic range of the SA-BOTDA system, which may be limited to the ~30 MHz linewidth of the Brillouin resonance, which corresponds to a change of ±15° C. or ±300µε.

FIG. 3A illustrates measured change in the Brillouin frequency, and FIG. 3B illustrates measured change in the Rayleigh frequency shift along optical fiber 111. Both FIGS. 3A and 3B illustrate the respective changes as the temperature at the temperature stage was increased by 5° C. and as the strain at the strain stage decreased by 20µε. FIG. 3C is a graph illustrating measured change in the Brillouin frequency, and FIG. 3D is a graph illustrating the measured change in the Rayleigh frequency shift. More particularly, FIGS. 3C and 3D illustrate the respective changes at temperature stage 111a, at strain stage 111b, and at a reference location (200 m into fiber 111) spaced apart from the temperature and strain stages.

Figure 4A:
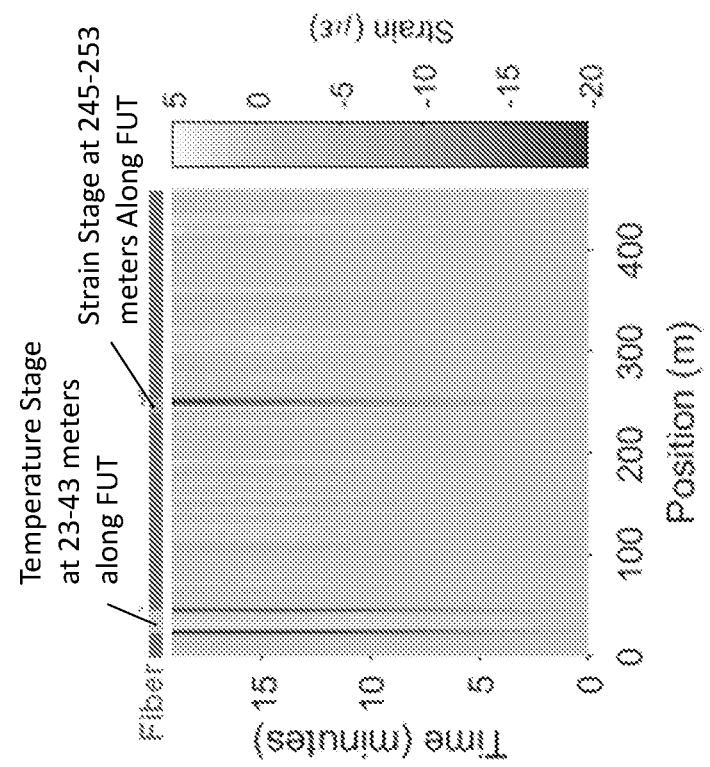
FIG. 4A illustrates measured temperature change along the optical fiber of FIG. 1A as the temperature at the temperature stage is increased and the strain at the strain stage is decreased according to some embodiments of inventive concepts.
Figure 4B:
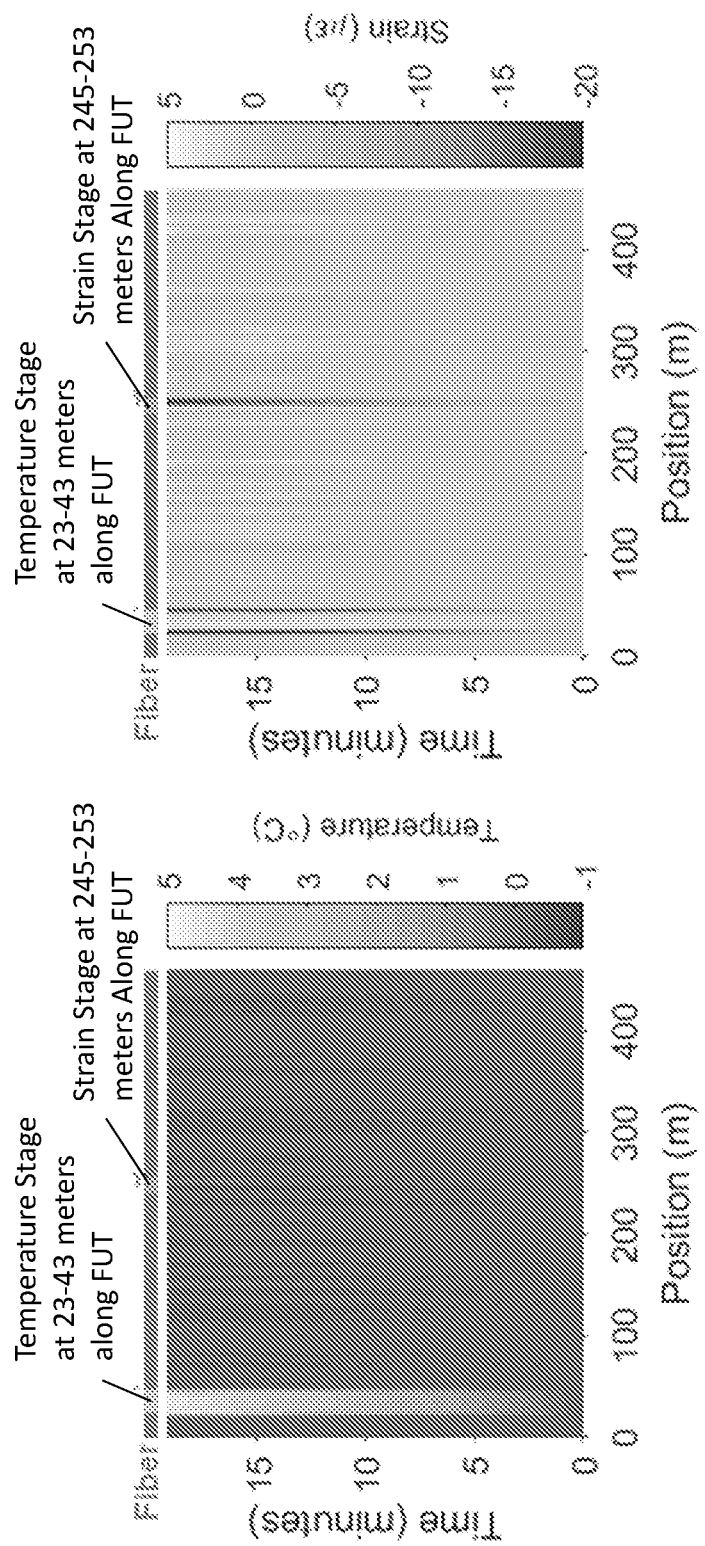
FIG. 4B illustrates measured strain change along the optical fiber of FIG. 1A as the temperature at the temperature stage is increased and the strain at the strain stage is decreased according to some embodiments of inventive concepts.
Figure 4C:
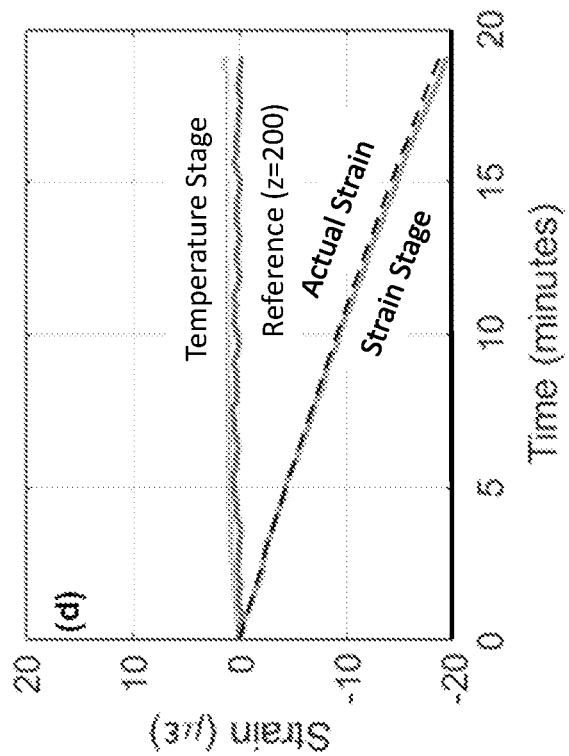
FIG. 4C is a graph illustrating the recovered temperature change at the temperature stage, the strain stage, and the reference position according to some embodiments of inventive concepts (where the dashed line indicates the actual temperature applied at the temperature stage)
Figure 4D:
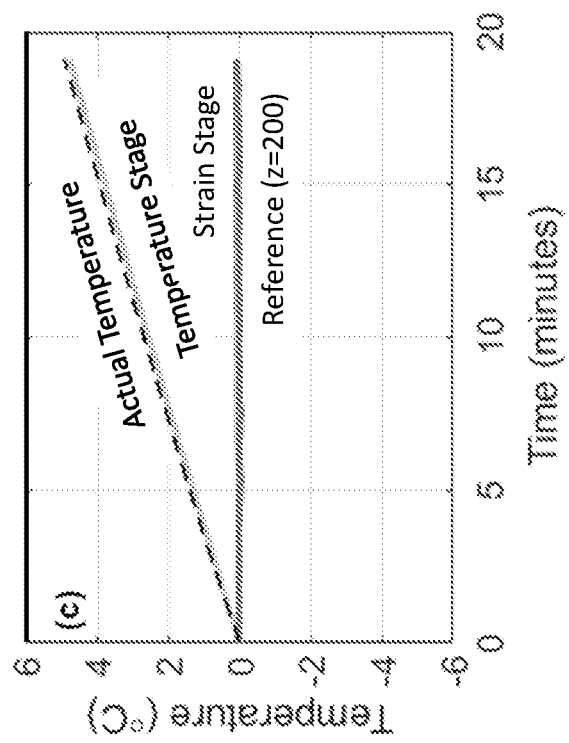
FIG. 4D is a graph illustrating the recovered strain change at the temperature stage, the strain stage, and the reference position according to some embodiments of inventive concepts (where the dashed line indicates the actual strain applied at the strain stage)

Equation (3) was used (e.g., by processor 163) to recover temperature and strain from the measurements shown in FIGS. 3A-D. FIG. 4A illustrates the recovered temperature and FIG. 4B illustrates the recovered strain at each position along fiber 111. Cross-sections of the recovered temperature are shown in FIG. 4C at the temperature stage 111a, strain stage 111b, and at the reference position while cross-sections of the recovered strain are shown in FIG. 4D. The actual temperature and strain applied to the two stages are also shown in FIGS. 4C and 4D. These figures confirm that the system is able to efficiently discriminate between temperature and strain with reduced/minimal cross-sensitivity.

To demonstrate that the combined system can discriminate between temperature and strain, processor 163 used Equation (3) along with the coefficients in Table 1 to process the data shown in FIGS. 3A-D. FIGS. 4A and 4B show the recovered temperature and strain at each position along the fiber as the temperature is increased at temperature stage 111a and the strain is decreased at strain stage 111b. FIGS. 4C and 4D show the temperature and strain at temperature stage 111a, strain stage 111b, and reference position. These figures confirm that the system was able to efficiently discriminate between temperature and strain with reduced/minimal crosstalk.

The results of FIGS. 3A, 3B, 3C, and 3D also reveal an artifact in the recovered strain, shown in FIG. 4B, where a change in strain was registered at the edges of temperature stage 111a. In this case, the transition onto the temperature stage was sharper than the 5 meter spatial resolution of the system. Since the Rayleigh system assumes that the temperature and strain will vary uniformly on the length scale of the spatial resolution, this sharp transition distorted the measured Rayleigh response at these positions. This is a known limitation of this type of Rayleigh system (see, Reference 24) and could be identified by processor 163 in post processing by noting the reduced correlation between the measured RBS spectrum and the reference RBS spectrum at this position and/or by noting the sharp change in $\Delta f_B$ observed at the edges of temperature stage 111a, indicating that the measurement may be compromised at these locations.

FIG. 4A illustrates measured temperature change, and FIG. 4B illustrates measured strain change all along optical fiber 111 (see diagram above each graph) as the temperature at temperature stage 111a increases and the strain at strain stage 111b decreases. The recovered temperature change is illustrated in the graph of FIG. 4C at temperature stage 111a, at strain stage 111b, and at the reference position (200 meters into FUT 111), and the recovered strain change is illustrated in the graph of FIG. 4D at temperature stage 111a, at strain stage 111b, and at the reference position (200 meters into optical fiber 111). The dashed lines indicate the actual temperature and strain applied to the two stages.

Dynamic Temperature/Strain Discrimination is discussed below.

To demonstrate the ability of the sensor of FIG. 1A to measure dynamic changes in strain and temperature, the strain and temperature of a single section of fiber 111 were simultaneously modulated. For this experiment, the fiber-wrapped PZT strain stage was placed on the temperature stage and the PZT was driven with a 50 Hz, ~600 nε peak-to-peak sinusoidal signal while the temperature was increasing. The graphs of FIGS. 5A and 5B respectively show a 200 ms measurement of the BFS and Rayleigh frequency shift, respectively. The graphs of both sensors reveal the presence of a 50 Hz modulation along with an overall linear trend due to the changing temperature.

Figure 5B:
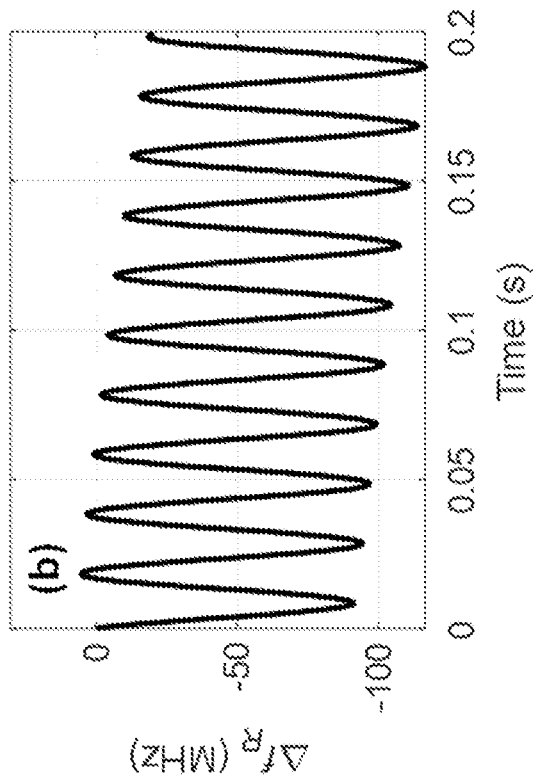
FIG. 5B is a graph illustrating measured change in Rayleigh frequency shift as an 8 meter section of the optical fiber of FIG. 1A was simultaneously exposed to 50 Hz sinusoidal strain and increasing temperature according to some embodiments of inventive concepts.
Figure 5A:
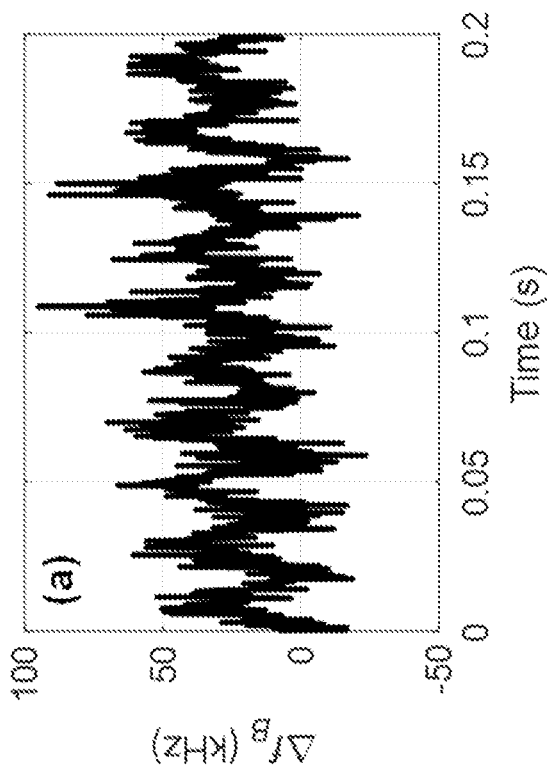
FIG. 5A is a graph illustrating measured change in the Brillouin frequency as an 8 meter section of the optical fiber of FIG. 1A was simultaneously exposed to 50 Hz sinusoidal strain and increasing temperature according to some embodiments of inventive concepts.
Figure 5D:
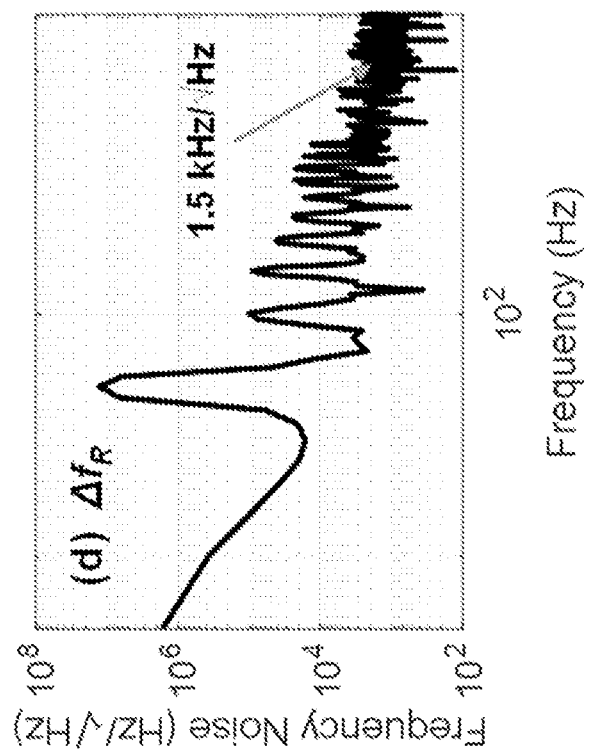
FIG. 5D is a graph illustrating an amplitude spectral density of the recorded Rayleigh frequency shift according to some embodiments of inventive concepts.
Figure 5C:
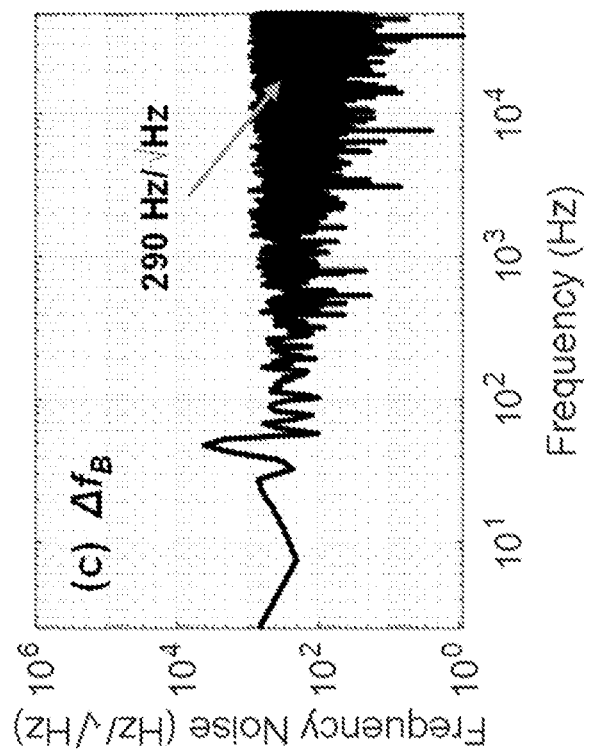
FIG. 5C is a graph illustrating an amplitude spectral density of the recorded Brillouin frequency shift according to some embodiments of inventive concepts.

The graphs of FIGS. 5C and 5D show the amplitude spectral density (ASD) of the BFS and the Rayleigh frequency shift, respectively. Note that the 50 Hz signal was observed as peaks in both the Brillouin and Rayleigh ASD plots. From these measurements the self-noise of each individual sensor can be evaluated. As shown in FIG. 5C, the SA-BOTDA system provided a frequency noise of 290 Hz/√Hz (corresponding to a strain noise of 6.1 nε/√Hz or a temperature noise of 0.29 m° C./√Hz). As shown in FIG. 5D, the FS-OTDR system provided a frequency noise of 1.5 kHz/√Hz (corresponding to 9.8 pε/√Hz or 1.1µ° C./√Hz). The lower strain/temperature noise of the FS-OTDR system is due to the higher responsivity of the RBS spectrum to temperature and strain.

The graph of FIG. 5A illustrates measured change in the Brillouin frequency, and the graph of FIG. 5B illustrates Rayleigh frequency shift as an 8 m section of fiber 111 was simultaneously exposed to a 50 Hz sinusoidal strain and increasing temperature. The graph of FIG. 5C illustrates amplitude spectral density (ASD) of the recorded BFS, and the graph of FIG. 5D illustrates ASD of the recorded Rayleigh frequency shift.

Figure 6A:
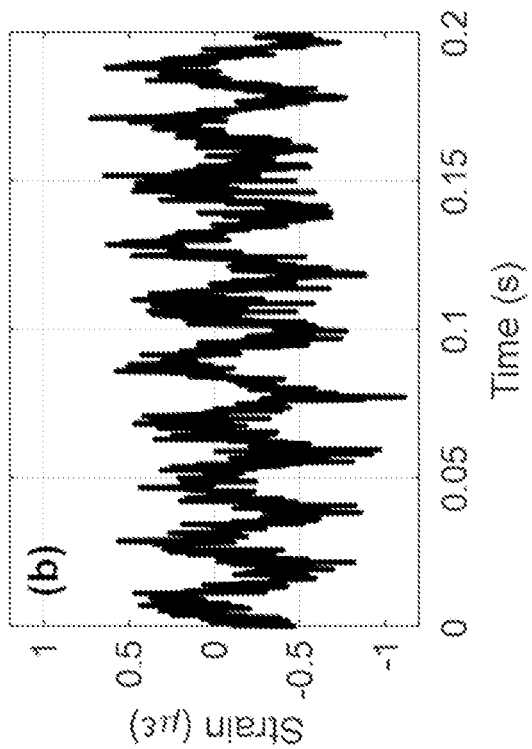
FIG. 6A is a graph illustrating recovered temperature on an 8 meter section of the optical fiber of FIG. 1A that was simultaneously exposed to a 50 Hz sinusoidal strain and increasing temperature according to some embodiments of inventive concepts.
Figure 6B:
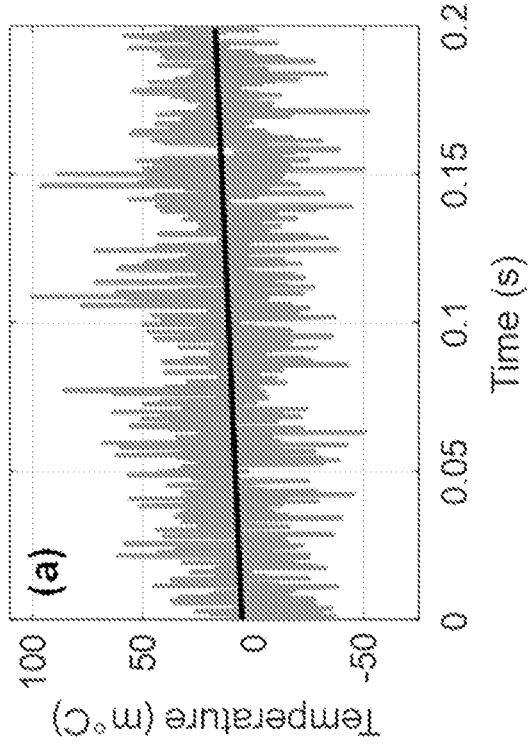
FIG. 6B is a graph illustrating recovered strain on an 8 meter section of the optical fiber of FIG. 1A that was simultaneously exposed to a 50 Hz sinusoidal strain and increasing temperature according to some embodiments of inventive concepts.
Figure 6C:
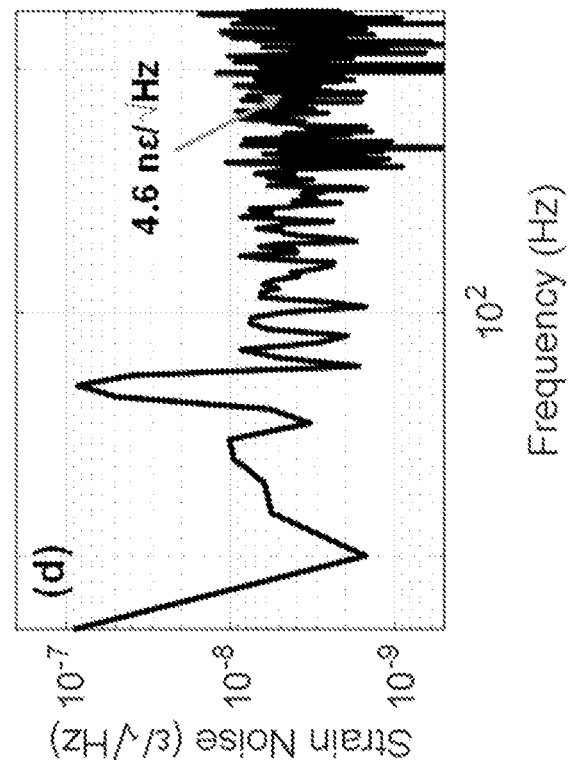
FIG. 6C is a graph illustrating amplitude spectral density of the recovered temperature of FIG. 6A according to some embodiments of inventive concepts.
Figure 6D:
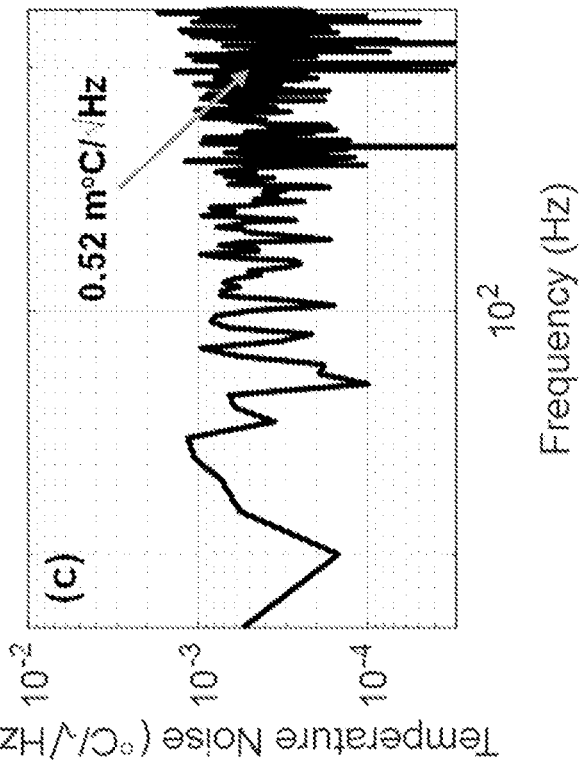
FIG. 6D is a graph illustrating amplitude spectral density of the recovered strain of FIG. 6B according to some embodiments of inventive concepts.

The graphs of FIGS. 6A and 6B respectively illustrate the recovered dynamic temperature and strain using the data of FIGS. 5A-B. In FIG. 6A, a linear fit (shown in black) was applied to the recovered temperature (shown in gray), indicating a gradual increase in temperature. FIG. 6B clearly shows the 50 Hz modulation due to the applied strain without the bias due to the changing temperature that was evident in the graphs of FIGS. 5A and 5B. The graphs of FIGS. 6C and 6D show the ASD of the recovered temperature and strain, respectively. It is clear in the ASDs that the 50 Hz signal is only present in the recovered strain (FIG. 6D). Since the 50 Hz signal has a signal-to-noise ratio of 25 dB in FIG. 6D, this indicates that the combined discrimination system suppresses cross-sensitivity between temperature and strain by at least 25 dB. Finally, the ASDs show a temperature noise of 0.52 m° C./√Hz and a strain noise of 4.6 nε/√Hz. This uncertainty may be primarily dictated by the noise of the SA-BOTDA system, since it is nearly 1000× higher than the noise of the FS-OTDR system.

Lastly, the temperature or strain noise ASD can be converted to a measurement uncertainty in a given measurement time. For example, the uncertainty per measurement, acquired every 290 µs, is 0.5 m° C./√Hz×√(1/290µs)~30 m° C. This is consistent with the standard deviation in the measured temperature shown in gray in FIG. 6A, which is ~23 m° C.

The graph of FIG. 6A illustrates recovered temperature information, and the graph of FIG. 6B illustrates recovered strain information for an 8 m section of fiber 111 that was simultaneously exposed to a 50 Hz sinusoidal strain and increasing temperature. In FIG. 6A, a linear fit (shown in black) was applied to the recovered temperature (gray) to highlight the gradual temperature increase. Amplitude spectral density (ASD) of the recovered temperature and strain are respectively illustrated in FIGS. 6C and 6D.

Quasi-Static Temperature-Strain Discrimination is discussed below.

Figure 7B:
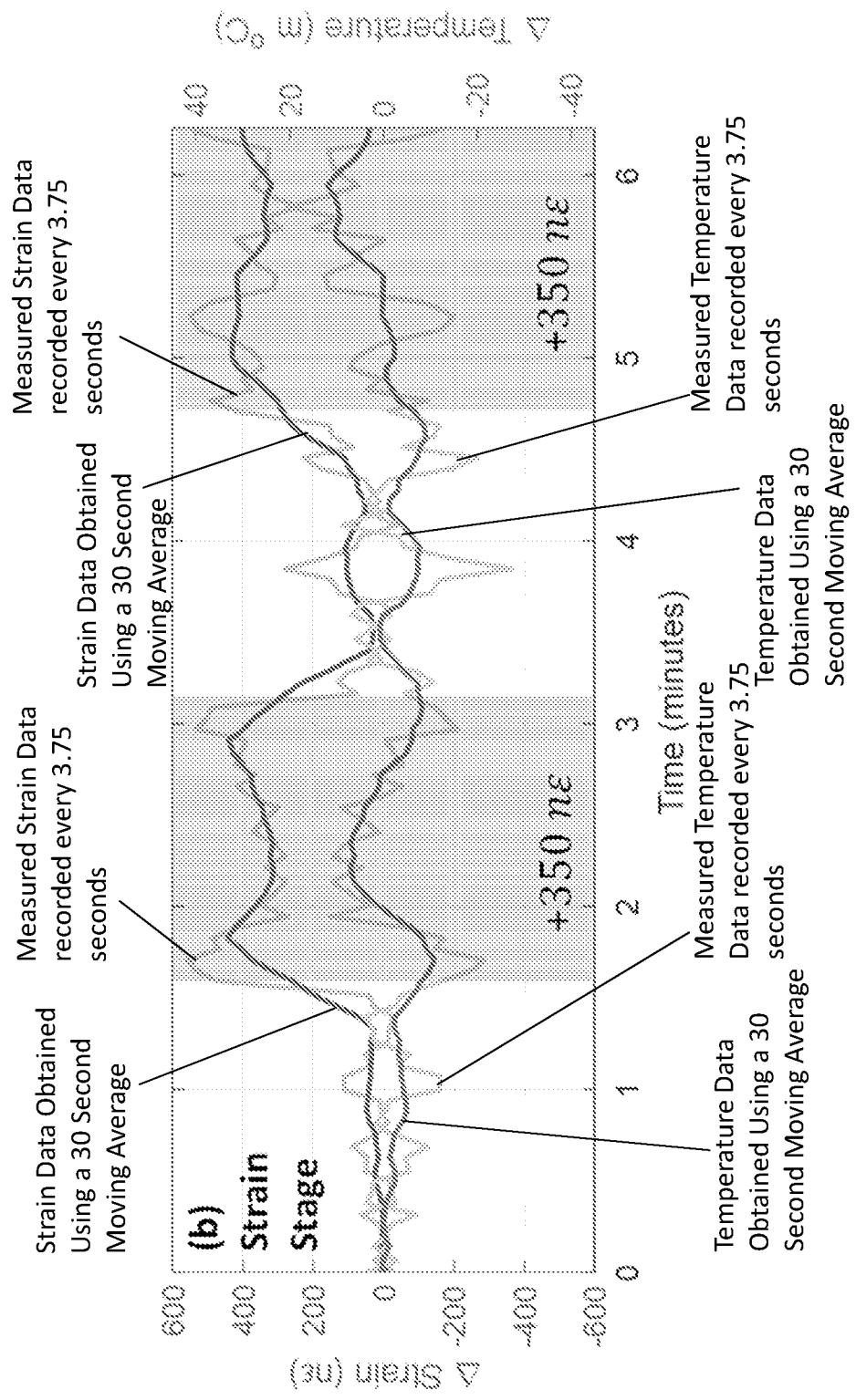
FIG. 7B is a graph illustrating recovered strain (on the left axis) and recovered temperature (on the right axis) at the strain stage of FIG. 1A according to some embodiments of inventive concepts as the strain was shifted by 350 nε at about every 1.55 minutes.

While the system of FIG. 1A is well-suited for dynamic temperature/strain discrimination, it may also enable low-noise quasi-static measurements. To illustrate the ability of the system to monitor small changes in temperature and strain over longer time-periods, a 6-minute measurement was recorded while modulating the temperature in 20 m° C. steps and modulating the strain stage in 350 nε steps. Note that the temperature and strain stages 111a and 111b were separated along fiber 111 for this experiment, as shown in FIG. 1A. During the measurement, 10 ms of data was recorded every 3.75 seconds, and the average temperature and strain were calculated during each 10 ms data acquisition. The measured temperature and strain resulting from this are shown in FIG. 7A for the temperature stage and FIG. 7B for the strain stage. The sensor of FIG. 1A is thus able to resolve a change of 20 m° C. or 350 nε.

To estimate the measurement uncertainty in this quasi-static regime, the standard deviation in the measured temperature and strain was calculated in a reference section of fiber 111 (from 260-460 meters) during the same 6-minute measurement. The temperature uncertainty was determined to be 15 m° C. and the strain uncertainty was determined to be 130 nε. This is somewhat higher than the dynamic ASD noise measurement predicted (where a temperature uncertainty of 5.2 m° C. and a strain uncertainty of 46 nε in each 10 ms measurement were expected). This increase in low frequency noise may be due to environmental drift in the state of the fiber (e.g., ambient temperature fluctuations in the laboratory) and/or changes in the polarization state which could introduce noise in the SA-BOTDA measurement due to the polarization dependence of the Brillouin frequency (see, Reference 46). Nonetheless, this measurement uncertainty is orders of magnitude lower than has been previously reported in single-mode fiber. For example, systems that use the BFS of two different Brillouin gain peaks report uncertainties of 2-5° C. and 40-80με (see, References 10, 11, 12, and 13), while hybrid Brillouin/Raman systems have reported uncertainties of ~6° C. and 150με (see, Reference 15). The system of FIG. 1A reported herein may also exhibit lower uncertainty than previously reported systems designed to measure birefringence in PM fiber, which achieved uncertainties as low as 40 m° C. and 500 nε (see, Reference 24).

The graph of FIG. 7A illustrates recovered strain (left axis) and temperature (right axis) at the temperature stage as the temperature was shifted by 20 m° C. every ~1.55 minutes (shaded region). The graph of FIG. 7B illustrates recovered strain (left axis) and temperature (right axis) at the strain stage as the strain was shifted by 350 nε every ~1.55 minutes (shaded region). The measured data recorded every 3.75 seconds is shown in light gray while the dark lines were obtained using a 30 s moving average. In general, it may be difficult to compare systems described here with other temperature-strain discrimination techniques reported in the literature since each of the systems use different spatial resolutions, fiber lengths, and measurement rates. Additionally, many of the other systems are not designed for dynamic measurements. To compare systems of present inventive concepts with competing architectures, fluctuations in the recovered temperature and strain were measured over the whole fiber as the temperature and strain were kept constant. Twenty-five 10 ms measurements were collected over ~1 minute. These measurements showed a temperature resolution of 0.012° C. and a strain resolution of 0.11με. This confirms that approaches of present inventive concepts may achieve higher sensitivity than competing temperature/strain discrimination techniques described in the literature. For example, systems that use the Brillouin frequency shift of two different Brillouin gain peaks report resolutions of 2-5° C. and 40-80με (see, references 10, 11, 12, and 13), while systems that combine the Brillouin frequency shift with a measure of the local birefringence (and therefore require PM fiber) report resolutions of 0.1-0.4° C. and 3-12με (see, references 21, 22, and 23). Systems disclosed herein according to some embodiments of inventive concepts may also provide the first dynamic measurement (~1.5 kHz bandwidth) capable of discriminating between temperature and strain.

Some embodiments of inventive concepts have been discussed above with respect to FIGS. 1A and 1B. Additional embodiments of inventive concepts may be provided by modifying the system of FIG. 1A as discussed below.

According to some additional embodiments, Rayleigh sensor parameters such as frequency step size and numbers of frequencies probed may be varied based on the application. In general, probing a wider range of frequencies will improve the dynamic range of the sensor, but reduce the sensor bandwidth. An ideal frequency step size for a typical application may be approximately $1/(4\tau)$, where $\tau$ is a pulse duration specific parameter (see, reference 31).

According to some additional embodiments, a hybrid system may be provided using a single seed laser rather than two lasers by frequency scanning laser "A" by inserting a scanning element before the first fiber coupler. In this case, the frequency scanning would be conducted without pulsing the laser and the pulses generated by polarization switch 125 would be used both for the Brillouin pump and the Rayleigh system. One challenge in this scheme may be to achieve sufficient carrier suppression in the probe path (through EOMs 115a and 115b) to reduce/avoid interference with the measured RBS light.

A significant requirement of EOMs 115a and 115b in FIG. 1A may be to generate the probe and LO frequencies. According to some additional embodiments, probe and LO frequency generation may be performed using a single EOM or using a combination of AOMs.

According to some additional embodiments, AOM 123 in FIG. 1A that is used to carve pulses and AOMs 125a and 125b of FIG. 1A that are used to control polarization switch 125 could be replaced by other types of modulators such as EOMs or semiconductor optical amplifiers.

According to some additional embodiments, frequency shifting AOM pair 133 is used in FIG. 1A to generate the frequency scanning pulse train that used to interrogate the FUT. In FIG. 1A, this was achieved using a pair of AOMs, but according to some additional embodiments, this can be achieved using any frequency scanning scheme, such as EOMs or directly frequency modulating the laser.

The sensing bandwidth of embodiments of FIG. 1A may be limited by the frequency scanning rate of the Rayleigh system. If higher bandwidth is required, the Rayleigh system could be modified according to some additional embodiments by using a chirped-pulse OTDR approach (see, reference 38) or via frequency multiplexing schemes (see, reference 20). These techniques may reduce the time required to record the RBS spectrum, but may require higher frequency modulation and detection electronics which could increase system cost.

According to some additional embodiments, dynamic range of the slope-assisted BOTDA system could be increased by modulating the probe frequency to track shifts in the Brillouin frequency along the fiber (see, reference 49). Alternatively, multiple pump frequencies could be used.

According to some embodiments of inventive concepts, two recently developed technologies (slope-assisted BOTDA and frequency scanning OTDR) may be combined to make a distributed fiber optic sensor that can discriminate between strain and temperature. Note that the slope-assisted BOTDA scheme used here was introduced in U.S. Pat. No. 11,473,983 (issued Oct. 18, 2022) entitled "Suppression of Noise and Cross-Talk in Brillouin Fiber Sensors," the disclosure of which is hereby incorporated herein in its entirety by reference. The new combination of technologies disclosed herein according to embodiments of inventive concepts provides state-of-the-art performance for systems that can achieve temperature-strain discrimination. A significant feature of this approach is that the system can use a single standard commercial unmodified single mode fiber. In contrast, other systems that can discriminate between strain and temperature may often require the use of a specialty fiber and/or polarization-maintaining fiber. Another significant feature of this approach is that this system, in addition to making static measurements of strain and temperature, is also well-suited to making dynamic measurements.

One approach to discriminate between temperature and strain is to deploy two fibers side-by-side. If only one of the two fibers is subject to strain (e.g., one of the fibers is secured to the strained structure, while the second fiber is loose), then the second fiber can provide a reference temperature measurement. However, this approach may have drawbacks in terms of deployment complexity, and strain-isolation may not be feasible in many applications. As a result, there is a long-standing interest in performing temperature/strain discrimination in a single fiber.

As mentioned above, at least two distinct observables are necessary for temperature-strain discrimination in a single fiber. Systems have been proposed to discriminate between temperature and strain. Early systems used the Brillouin frequency shift along with measurements of the spontaneous Brillouin scattered power (see, references 5 and 6). However, these systems were limited by the weak spontaneous Brillouin signal and required extensive averaging. Later systems used stimulated Brillouin scattering to measure the frequency shift of two different Brillouin gain peaks (see, references 10, 11, 12, and 13). However, changes in the Brillouin frequency with temperature and strain are similar for many gain peaks, making discrimination challenging. Additionally, the Brillouin peaks often are within 200-300 MHz of one another, leading to cross talk between peaks. Other discrimination techniques include those that combined Brillouin sensing with Raman sensing (see, reference 15) and those that used the Brillouin frequency shift in two different spatial modes in few mode fiber (see, reference 9). However, the modest sensitivity and update rate of these systems tended to limit the overall sensor performance to static measurements with temperature/strain uncertainties of ~2° C./~40µε.

Finally, there have been a few studies that combined Brillouin frequency measurements with Rayleigh scattering systems (see, references 16 and 50). These systems combine a standard Brillouin optical time-domain analysis (BOTDA) scheme with either optical frequency domain reflectometry (OFDR) (see, reference 16) or a frequency scanning OTDR (see, reference 50). In these systems, as well as the earlier systems, the Brillouin frequency shift was determined by scanning a probe beam across the Brillouin gain peak, and fitting the gain curve to a Lorentzian (i.e. a standard Brillouin optical time-domain analysis, BOTDA scheme). Yet this approach is time consuming and sensitive to noise and cross-talk due to fluctuations in the laser power and frequency. Additionally, the approach is not well-suited to making dynamic measurements. In contrast, the slope-assisted approach used in this invention addresses those noise sources and is well suited for dynamic measurements.

Another approach relies on measuring birefringence in a polarization maintaining (PM) fiber. For example, Rayleigh scattering may be measured on two axes in a PM fiber (see, reference 24), enabling sensitivity of 0.04° C./0.5µε, although the system was limited to static measurements (~1 minute to collect a single measurement). Similarly, dynamic Brillouin grating based systems also measured the birefringence in PM fiber, achieving relatively high sensitivity in static measurements (see, references 21, 22, and 23). However, these systems both required the use of PM fiber, which can be cost prohibitive and may typically limit systems to optical fiber lengths of 10's of meters.

Distributed fiber sensors based on Brillouin and Rayleigh scattering may enable low noise measurements in both the dynamic and quasi-static regimes. However, these advances have not been fully exploited to improve/optimize systems for temperature/strain discrimination. In the present disclosure, a hybrid system has been presented that integrates a SA-BOTDA sensor with a FS-OTDR sensor using a single optical fiber. This approach enables both dynamic and static measurements with low-noise and improved/excellent temperature/strain discrimination. In a quasi-static test, a sensor according to some embodiments of the present disclosure achieved a temperature uncertainty of 15 m° C. and a strain uncertainty of 130 nε. Dynamic measurements presented herein also reveal a temperature (strain) noise amplitude spectral density of 0.52 m° C./√Hz (4.6 nε/√Hz). This represents a significant improvement in noise and/or measurement speed compared to competing temperature/strain discrimination techniques.

A sensor 100 according to some embodiments of inventive concepts is discussed below with respect to FIGS. 1A, 1B, and 1C. According to such embodiments, sensor 100 includes optical fiber 111 (having first and second ends 111-1 and 111-2), Brillouin signal generator 101, Rayleigh signal generator 105, first coupler 109, second coupler 107, wavelength division multiplexer 140, Brillouin detector 141, and controller 161. Brillouin signal generator 101 is configured to generate a plurality of Brillouin pump laser pulses, a Brillouin Stokes probe laser beam, and a Brillouin Anti-Stokes probe laser beam. Each of the plurality of Brillouin pump laser pulses has a Brillouin pump frequency $f_{pump}$, the Brillouin Stokes probe laser beam has a Brillouin Stokes probe frequency $f_{probe,S}$, the Brillouin Anti-Stokes probe laser beam has a Brillouin Anti-Stokes probe frequency $f_{probe,A}$. Moreover, the Brillouin Stokes probe frequency $f_{probe,S}$, the Brillouin Anti-Stokes probe frequency $f_{probe,A}$, and the Brillouin pump frequency $f_{pump}$ are included in a Brillouin frequency band.

Rayleigh signal generator 105 is configured to generate a plurality of Rayleigh seed pulses of a Rayleigh seed pulse train. Each of the plurality of Rayleigh seed pulses of the Rayleigh seed pulse train has a respective different frequency included in a Rayleigh frequency band. Moreover, the Brillouin and Rayleigh frequency bands are mutually exclusive.

First coupler 109 is configured to couple the plurality of Brillouin pump laser pulses and the plurality of Rayleigh seed pulses of the Rayleigh seed pulse train into the first end (111-1) of the optical fiber (111). Second coupler 107 is configured to couple the Brillouin Stokes and Brillouin Anti-Stokes probe laser beams into the second end 111-2 of optical fiber 111.

Wavelength division multiplexer 140 is coupled with first coupler 109. Moreover, first coupler 109 is further configured to couple frequencies included in the Brillouin frequency band from the first end 111-1 of the optical fiber to the wavelength division multiplexer 140 and to couple Rayleigh backscatter signals included in the Rayleigh frequency band from the first end 111-1 of the optical fiber to the wavelength division multiplexer 140.

Brillouin detector 141 is coupled with wavelength division multiplexer 140. Wavelength division multiplexer 140 is configured to couple the frequencies included in the Brillouin frequency band to the Brillouin detector 141. Rayleigh detector 151 is coupled with wavelength division multiplexer 140). Wavelength division multiplexer 140 is configured to couple the Rayleigh backscatter signals included in the Rayleigh frequency band to the Rayleigh detector 151.

Controller 161 is coupled with Brillouin detector 141 and Rayleigh detector 151. Controller 161 is configured to calculate the temperature measurements and the strain measurements at different positions distributed along optical fiber 111 based on outputs from the Brillouin detector 141 and based on outputs from the Rayleigh detector 151. Controller 161, for example, may be configured to receive outputs from Brillouin and Rayleigh detectors 141 and 151 through communication interface 167, and processor 163 may be further configured to calculate the temperature and strain measurements based on the outputs from the detectors using code stored in memory 165.

According to some embodiments of sensor 100, the plurality of Brillouin pump laser pulses include first and second Brillouin pump laser pulses having orthogonal polarization states. The first and second Brillouin pump laser pulses are coupled into first end 111-1 of optical fiber 111 during a period of time between coupling an initial and a final of the Rayleigh seed pulses so that each of the strain and temperature measurements is calculated for at least a portion of the period of time between coupling the initial and the final of the Rayleigh seed pulses.

According to some embodiments of sensor 100, Brillouin signal generator 101 is further configured to generate a Brillouin Stokes local oscillator beam and a Brillouin Anti-Stokes local oscillator beam. The Brillouin Stokes local oscillator beam has a Brillouin Stokes local oscillator frequency $f_{LO,S}$ offset from the Brillouin Stokes probe frequency $f_{probe,S}$, the Brillouin Anti-Stokes local oscillator beam has a Brillouin Anti-Stokes local oscillator frequency $f_{LO,A}$ offset from the Brillouin Anti-Stokes probe frequency $f_{probe,A}$, and the Brillouin Stokes local oscillator frequency $f_{LO,S}$ and the Brillouin Anti-Stokes local oscillator frequency $f_{LO,A}$ are included in the Brillouin frequency band. In addition, the second coupler 107 is further configured to couple the Brillouin Stokes local oscillator beam and the Brillouin Anti-Stokes local oscillator beam into second end 111-2 of optical fiber 111.

According to some embodiments of sensor 100, the Brillouin Stokes local oscillator frequency $f_{LO,S}$ is between the Brillouin Stokes probe frequency $f_{probe,S}$ and the Brillouin pump frequency $f_{pump}$, and the Brillouin Anti-Stokes local oscillator frequency $f_{LO,A}$ is between the Brillouin Anti-Stokes probe frequency $f_{probe,A}$ and the Brillouin pump frequency $f_{pump}$. According to some other embodiments, the Brillouin Stokes probe frequency $f_{probe,S}$ is between the Brillouin Stokes local oscillator frequency ($f_{LO,S}$ and the Brillouin pump frequency $f_{pump}$, and the Brillouin Anti-Stokes probe frequency $f_{probe,A}$ is between the Brillouin Anti-Stokes local oscillator frequency $f_{LO,A}$ and the Brillouin pump frequency $f_{pump}$.

According to some embodiments of sensor 100, Brillouin detector 141 may include Stokes photodetector 143a and Anti-Stokes photodetector 143b. Wavelength division multiplexer 140 may be further configured to couple frequencies including the Brillouin Stokes probe frequency $f_{probe,S}$ and the Brillouin Stokes local oscillator frequency $f_{LO,S}$ to Stokes photodetector 143a. Wavelength division multiplexer 140 may also be configured to couple frequencies including the Brillouin Anti-Stokes probe frequency $f_{probe,A}$ and the Brillouin Anti-Stokes local oscillator frequency $f_{LO,A}$ to Anti-Stokes photodetector 143b. Controller 161 may thus be configured to calculate the temperature measurements and the strain measurements based on outputs from Stokes and Anti-Stokes photodetectors 143a and 143b.

According to some embodiment of sensor 100, the plurality of Brillouin pump laser pulses interact with the Brillouin Stokes probe laser beam and the Brillouin Anti-Stokes probe laser beam in optical fiber 111 to stimulate Brillouin scattering in optical fiber 111. Moreover, first coupler 109 is further configured to couple the Brillouin scattering from first end 111-1 of optical fiber 111 to wavelength division multiplexer 140, and wavelength division multiplexer 140 is further configured to couple the Brillouin scattering to Brillouin detector 141.

According to some embodiments of sensor 100, alternating ones of the plurality of Brillouin pump laser pulses have orthogonal polarization states, and/or the plurality of Brillouin pump laser pulses and the Rayleigh seed pulses are provided with a same repetition rate and a same pulse width.

According to some embodiments of sensor 100, controller 161 may be configured to calculate the temperature measurements and the strain measurements by performing the following operations. Respective changes in Brillouin frequency shift $\Delta f_B$ corresponding to the different positions distributed along optical fiber 111 may be calculated based on the outputs from Brillouin detector 141. Respective changes in Rayleigh backscattered spectrum $\Delta f_R$ corresponding to the different positions distributed along optical fiber 111 may be calculated based on the outputs from the Rayleigh detector. The temperature measurements and the strain measurements at the different positions distributed along the optical fiber may be calculated based on the respective changes in Brillouin frequency shift $\Delta f_B$ at the different positions and the respective changes in Rayleigh backscattered spectrum $\Delta f_R$ at the different positions.

According to some embodiments of sensor 100, the Brillouin Stokes probe frequency corresponds to a Brillouin stokes peak and is shifted from the Brillouin pump frequency by a Brillouin frequency defined by the optical fiber. Moreover, the Brillouin Anti-Stokes probe frequency corresponds to a Brillouin anti-stokes peak and is shifted from the Brillouin pump frequency by the Brillouin frequency defined by the optical fiber.

A method providing temperature measurements and strain measurements distributed along optical fiber 111 (having first end 111-1 and second end 111-2) is discussed below with respect to FIGS. 1A, 1B, and 1C.

A plurality of Brillouin pump laser pulses are coupled into first end 111-1 of optical fiber 111, and each of the plurality of Brillouin pump laser pulses has a Brillouin pump frequency $f_{pump}$. Brillouin Stokes and Brillouin Anti-Stokes probe laser beams are coupled into second end 111-2 of optical fiber 111. The Brillouin Stokes probe laser beam has a Brillouin Stokes probe frequency $f_{probe,S}$. The Brillouin Anti-Stokes probe laser beam has a Brillouin Anti-Stokes probe frequency $f_{probe,A}$. Moreover, the Brillouin Stokes probe frequency $f_{probe,S}$, the Brillouin Anti-Stokes probe frequency $f_{probe,A}$, and the Brillouin pump frequency $f_{pump}$ are included in a Brillouin frequency band.

A plurality of Rayleigh seed pulses of a Rayleigh seed pulse train are coupled into optical fiber 111. Each of the plurality of Rayleigh seed pulses of the Rayleigh seed pulse train has a respective different frequency included in a Rayleigh frequency band, and the Brillouin and Rayleigh frequency bands are mutually exclusive.

Frequencies included in the Brillouin frequency band are coupled from first end 111-1 of optical fiber 111 to Brillouin detector 141. Rayleigh backscatter signals included in the Rayleigh frequency band are coupled from optical fiber 111 to a Rayleigh detector 151.

The strain measurements and the temperature measurements at different positions distributed along optical fiber 111 are calculated based on outputs from Brillouin detector 141 and based on outputs from the Rayleigh detector 151.

According to some embodiments of the method, the plurality of Brillouin pump laser pulses includes first and second Brillouin pump laser pulses having orthogonal polarization states. The first and second Brillouin pump laser pulses are coupled into first end 111-1 of optical fiber 111 during a period of time between coupling an initial and a final of the Rayleigh seed pulses so that each of the strain and temperature measurements is calculated for at least a portion of the period of time between coupling the initial and the final of the Rayleigh seed pulses.

According to some embodiments of the method, a Brillouin Stokes local oscillator beam and a Brillouin Anti-Stokes local oscillator beam are coupled into second end 111-2 of optical fiber 111. The Brillouin Stokes local oscillator beam has a Brillouin Stokes local oscillator frequency $f_{LO,S}$ offset from the Brillouin Stokes probe frequency $f_{probe,S}$, and the Brillouin Anti-Stokes local oscillator beam has a Brillouin Anti-Stokes local oscillator frequency $f_{LO,A}$ offset from the Brillouin Anti-Stokes probe frequency $f_{probe,A}$. Moreover, the Brillouin Stokes local oscillator frequency $f_{LO,S}$ and the Brillouin Anti-Stokes local oscillator frequency $f_{LO,A}$ are included in the Brillouin frequency band.

According to some embodiments, the Brillouin Stokes local oscillator frequency $f_{LO,S}$ is between the Brillouin Stokes probe frequency $f_{probe,S}$ and the Brillouin pump frequency $f_{pump}$, and the Brillouin Anti-Stokes local oscillator frequency $f_{LO,A}$ is between the Brillouin Anti-Stokes probe frequency $f_{probe,A}$ and the Brillouin pump frequency $f_{pump}$. According to some other embodiments, the Brillouin Stokes probe frequency $f_{probe,S}$ is between the Brillouin Stokes local oscillator frequency $f_{LO,S}$ and the Brillouin pump frequency $f_{pump}$, and the Brillouin Anti-Stokes probe frequency $f_{probe,A}$ is between the Brillouin Anti-Stokes local oscillator frequency $f_{LO,A}$ and the Brillouin pump frequency $f_{pump}$.

According to some embodiments of the method, the Brillouin detector 141 includes a Stokes photodetector 143a and an Anti-Stokes photodetector 143b. Frequencies including the Brillouin Stokes probe frequency $f_{probe,S}$ and the Brillouin Stokes local oscillator frequency $f_{LO,S}$ are coupled with the Stokes photodetector 143a. Frequencies including the Brillouin Anti-Stokes probe frequency $f_{probe,A}$ and the Brillouin Anti-Stokes local oscillator frequency $f_{LO,A}$ are coupled with the Anti-Stokes photodetector 143b. Moreover, the strain and temperature measurements are calculated based on outputs from the Stokes and Anti-Stokes photodetectors 143a and 143b.

According to some embodiments of the method, the plurality of Brillouin pump laser pulses interact with the Brillouin Stokes probe laser beam and the Brillouin Anti-Stokes probe laser beam in the optical fiber to stimulate Brillouin scattering in the optical fiber. Moreover, coupling the frequencies included in the Brillouin frequency band comprises coupling the Brillouin scattering from first end 111-1 of optical fiber 111 to Brillouin detector 141.

According to some embodiments of the method, alternating ones of the plurality of Brillouin pump laser pulses have orthogonal polarization states, and/or the plurality of Brillouin pump laser pulses and the Rayleigh seed pulses are provided with a same repetition rate and a same pulse width.

According to some embodiments of the method, the plurality of Rayleigh seed pulses are coupled into first end 111-1 of optical fiber 111, and the Rayleigh backscatter signals are coupled from first end 111-1 of optical fiber 111 to Rayleigh detector 151.

According to some embodiments of the method, the strain measurements and the temperature measurements may be calculated using the following operations. Respective changes in Brillouin frequency shift $\Delta f_B$ corresponding to the different positions distributed along optical fiber 111 are calculated based on the outputs from the Brillouin detector 141. Respective changes in Rayleigh backscattered spectrum $\Delta f_R$ corresponding to the different positions distributed along optical fiber 111 are calculated based on the outputs from the Rayleigh detector. The strain measurements and the temperature measurements at the different positions distributed along optical fiber 111 are calculated based on the respective changes in Brillouin frequency shift $\Delta f_B$ at the different positions and the respective changes in Rayleigh backscattered spectrum $\Delta f_R$ at the different positions.

According to some embodiments of the method, the Brillouin Stokes probe frequency corresponds to a Brillouin stokes peak and is shifted from the Brillouin pump frequency by the Brillouin frequency defined optical fiber 111. Moreover, the Brillouin Anti-Stokes probe frequency corresponds to a Brillouin anti-stokes peak and is shifted from the Brillouin pump frequency by the Brillouin frequency defined by optical fiber 111.

According to some embodiments of inventive concepts, new combinations of Brillouin and Rayleigh technologies may provide both dynamic and static temperature strain discrimination in a commercial off the shelf (COTS) single mode fiber. Such embodiments may achieve at least 25 dB of cross-sensitivity rejection, at least 16 m° C. temperature resolution, and/or at least 140 nε strain resolution. Such embodiments may thus provide resolutions that are more than 200 times better than that of prior systems.

Some embodiments of the inventive concepts may be used to enhance fiber optic sensors used to perform distributed temperature/strain measurements for structural health monitoring and/or ocean sensing. Some embodiments of inventive concepts may be used to provide isolated temperature and/or strain measurements in applications such as pipeline monitoring, well monitoring, structural health monitoring, distributed temperature measurements in the ocean, etc.

A listing of cited the References is provided below. References are cited in the disclosure above with a number corresponding to the number associated with each reference below. The disclosures of each of these references are hereby incorporated herein in their entireties by reference.

Reference 1. J. C. Juarez and H. F. Taylor, "Distributed fiber optic intrusion sensor system," J. Light. Technol. 23(6), 2081-2087 (2005).

Reference 2. D. Wada, H. Igawa, M. Tamayama, T. Kasai, H. Arizono, H. Murayama, N. Isoda, and M. Katsuta, "Fiber-optic simultaneous distributed monitoring of strain and temperature for an aircraft wing during flight," Appl. Opt. 57(36), 10458 (2018).

Reference 3. X. He, S. Xie, L. Gu, F. Liu, M. Zhang, and H. Lu, "High-resolution quasi-distributed temperature and pressure sensing system for deep-sea reservoir monitoring," Measurement 199(April), 111568 (2022).

Reference 4. J. D. C. Jones, "Review of Fibre Sensor Techniques for Temperature-Strain Discrimination," in 12th International Conference on Optical Fiber Sensors (OSA, 1997), 16(2), pp. 36-39.

Reference 5. T. R. Parker, M. Farhadiroushan, R. Feced, V. A. Handerek, and A. J. Rogers, "Simultaneous distributed measurement of strain and temperature from noise-initiated Brillouin scattering in optical fibers," IEEE J. Quantum Electron. 34(4), 645-659 (1998).

Reference 6. H. H. Kee, G. P. Lees, and T. P. Newson, "All-fiber system for simultaneous interrogation of distributed strain and temperature sensing by spontaneous Brillouin scattering," Opt. Lett. 25(10), 695 (2000).

Reference 7. X. Liu and X. Bao, "Brillouin spectrum in LEAF and simultaneous temperature and strain measurement," J. Light. Technol. 30(8), 1053-1059 (2012).

Reference 8. R. Ruiz-Lombera, A. Fuentes, L. Rodriguez-Cobo, J. M. Lopez-Higuera, and J. Mirapeix, "Simultaneous temperature and strain discrimination in a conventional BOTDA via artificial neural networks," J. Light. Technol. 36(11), 2114-2121 (2018).

Reference 9. A. Li, Y. Wang, J. Fang, M.-J. Li, B. Y. Kim, and W. Shieh, "Few-mode fiber multi-parameter sensor with distributed temperature and strain discrimination," Opt. Lett. 40(7), 1488 (2015).

Reference 10. C. C. Lee, P. W. Chiang, and S. Chi, "Utilization of a dispersion-shifted fiber for simultaneous measurement of distributed strain and temperature through Brillouin frequency shift," IEEE Photonics Technol. Lett. 13(10), 1094-1096 (2001).

Reference 11. L. Zou, X. Bao, S. A. V., and L. Chen, "Dependence of the Brillouin frequency shift on strain and temperature in a photonic crystal fiber," Opt. Lett. 29(13), 1485-1487 (2004).

Reference 12. W. Zou, Z. He, M. Kishi, and K. Hotate, "Stimulated Brillouin scattering and its dependences on temperature and strain in a high-delta optical fiber with F-doped depressed inner-cladding," Opt. Lett. 32(6), 600-602 (2007).

Reference 13. Z. Li, L. Yan, X. Zhang, and W. Pan, "Temperature and Strain Discrimination in BOTDA Fiber Sensor by Utilizing Dispersion Compensating Fiber," IEEE Sens. J. 18(17), 7100-7105 (2018).

Reference 14. C. Karapanagiotis, K. Hicke, A. Wosniok, and K. Krebber, "Distributed humidity fiber-optic sensor based on BOFDA using a simple machine learning approach," Opt. Express 30(8), 12484 (2022).

Reference 15. M. N. Alahbabi, Y. T. Cho, and T. P. Newson, "Simultaneous temperature and strain measurement with combined spontaneous Raman and Brillouin scattering," Opt. Lett. 30(11), 1276 (2005).

Reference 16. D. P. Zhou, W. Li, L. Chen, and X. Bao, "Distributed temperature and strain discrimination with stimulated brillouin scattering and rayleigh backscatter in an optical fiber," Sensors 13(2), 1836-1845 (2013).

Reference 17. J. B. Murray and B. Redding, "Combining Stokes and anti-Stokes interactions to achieve ultra-low noise dynamic Brillouin strain sensing," APL Photonics 5(11), (2020).

Reference 18. J. B. Murray, A. Cerjan, and B. Redding, "Distributed Brillouin fiber laser sensor," Optica 9(1), 80 (2022).

Reference 19. L. Costa, H. F. Martins, S. Martin-Lopez, M. R. Fernandez-Ruiz, and M. Gonzalez-Herraez, "Fully Distributed Optical Fiber Strain Sensor With 10-12 $\epsilon/\sqrt{Hz}$ Sensitivity," J. Light. Technol. 37(18), 4487-4495 (2019).

Reference 20. H. M. Ogden, M. J. Murray, J. B. Murray, C. Kirkendall, and B. Redding, "Frequency multiplexed coherent $\varphi$-OTDR," Sci. Rep. 11(1), 1-12 (2021).

Reference 21. W. Zou, Z. He, and K. Hotate, "Complete discrimination of strain and temperature using Brillouin frequency shift and birefringence in a polarization-maintaining fiber," Opt. Express 17(3), 1248 (2009).

Reference 22. W. Zou, Z. He, and K. Hotate, "Demonstration of Brillouin Distributed Discrimination of Strain and Temperature Using a Polarization-Maintaining Optical Fiber," IEEE Photonics Technol. Lett. 22(8), 526-528 (2010).

Reference 23. Y. Dong, L. Chen, and X. Bao, "High-spatial-resolution time-domain simultaneous strain and temperature sensor using brillouin scattering and birefringence in a polarization-maintaining fiber," IEEE Photonics Technol. Lett. 22(18), 1364-1366 (2010).

Reference 24. X. Lu, M. A. Soto, and L. Thevenaz, "Temperature-strain discrimination in distributed optical fiber sensing using phase-sensitive optical time-domain reflectometry," Opt. Express 25(14), 16059 (2017).

Reference 25. J. Hu, L. Xia, L. Yang, W. Quan, and X. Zhang, "Strain-induced vibration and temperature sensing BOTDA system combined frequency sweeping and slope-assisted techniques," Opt. Express 24(12), 13610 (2016).

Reference 26. A. Coscetta, E. Catalano, E. Cerri, N. Cennamo, L. Zeni, and A. Minardo, "Hybrid Brillouin/Rayleigh sensor for multiparameter measurements in optical fibers," Opt. Express 29(15), 24025 (2021).

Reference 27. X. Zhou, F. Wang, Z. Liu, Y. Lu, C. Yang, Y. Zhang, L. Shao, and X. Zhang, "Hybrid B-OTDR/Φ-OTDR for multi-parameter measurement from a single end of fiber," Opt. Express 30(16), 29117-29127 (2022).

Reference 28. R. Bernini, A. Minardo, and L. Zeni, "Dynamic strain measurement in optical fibers by stimulated Brillouin scattering," Opt. Lett. 34(17), 2613 (2009).

Reference 29. Y. Koyamada, M. Imahama, K. Kubota, and K. Hogari, "Fiber-Optic Distributed Strain and Temperature Sensing With Very High Measurand Resolution Over Long Range Using Coherent OTDR," J. Light. Technol. 27(9), 1142-1146 (2009).

Reference 30. L. Zhou, F. Wang, X. Wang, Y. Pan, Z. Sun, J. Hua, and X. Zhang, "Distributed strain and vibration sensing system based on phase-sensitive OTDR," IEEE Photonics Technol. Lett. 27(17), 1884-1887 (2015).

Reference 31. S. Liehr, S. Münzenberger, and K. Krebber, "Wavelength-scanning coherent OTDR for dynamic high strain resolution sensing," Opt. Express 26(8), 10573-10588 (2018).

Reference 32. A. Masoudi and T. P. Newson, "Contributed review: Distributed optical fibre dynamic strain sensing," Rev. Sci. Instrum. 87(1), 11501 (2016).

Reference 33. D. Zhou, Y. Dong, B. Wang, T. Jiang, D. Ba, P. Xu, H. Zhang, Z. Lu, and H. Li, "Slope-assisted BOTDA based on vector SBS and frequency-agile technique for wide-strain-range dynamic measurements," Opt. Express 25(3), 1889 (2017).

Reference 34. G. Yang, X. Fan, and Z. He, "Strain dynamic range enlargement of slope-assisted BOTDA by using brillouin phase-gain ratio," J. Light. Technol. 35(20), 4451-4458 (2017).

Reference 35. Y. Peled, A. Motil, and M. Tur, "Fast Brillouin optical time domain analysis for dynamic sensing," Opt. Express 20(8), 8584 (2012).

Reference 36. D. Ba, B. Wang, D. Zhou, M. Yin, Y. Dong, H. Li, Z. Lu, and Z. Fan, "Distributed measurement of dynamic strain based on multi-slope assisted fast BOTDA," Opt. Express 24(9), 9781 (2016).

Reference 37. J. P. Von Der Weid, R. Passy, G. Mussi, and N. Gisin, "On the characterization of optical fiber network components with optical frequency domain reflectometry," J. Light. Technol. 15(7), 1131-1141 (1997).

Reference 38. J. Pastor-Graells, H. F. Martins, A. Garcia-Ruiz, S. Martin-Lopez, and M. Gonzalez-Herraez, "Single-shot distributed temperature and strain tracking using direct detection phase-sensitive OTDR with chirped pulses," Opt. Express 24(12), 13121 (2016).

Reference 39. D. Chen, Q. Liu, Y. Wang, H. Li, and Z. He, "Fiber-optic distributed acoustic sensor based on a chirped pulse and a non-matched filter," Opt. Express 27(20), 29415 (2019).

Reference 40. K. Hotate, K. Abe, and K. Y. Song, "Suppression of signal fluctuation in Brillouin optical correlation domain analysis system using polarization diversity scheme," IEEE Photonics Technol. Lett. 18(24), 2653-2655 (2006).

Reference 41. B. J. Soller, D. K. Gifford, M. S. Wolfe, and M. E. Froggatt, "High resolution optical frequency domain reflectometry for characterization of components and assemblies," Opt. Express 13(2), 666 (2005).

Reference 42. L. Zhang, L. D. Costa, Z. Yang, M. A. Soto, M. Gonzalez-Herraez, and L. Thevenaz, "Analysis and Reduction of Large Errors in Rayleigh-Based Distributed Sensor," J. Light. Technol. 37(18), 4710-4719 (2019).

Reference 43. Y. Mizuno, N. Hayashi, H. Tanaka, Y. Wada, and K. Nakamura, "Brillouin scattering in multi-core optical fibers for sensing applications," Sci. Rep. 5,1-9 (2015).

Reference 44. Y. Tanaka and Y. Ozaki, "Brillouin frequency shift measurement with virtually controlled sensitivity," Appl. Phys. Express 10(6), (2017).

Reference 45. Y. Zhi, P. Shi, and L. Yongqian, "Research on COTDR for measuring distributed temperature and strain," in 2011 Second International Conference on Mechanic Automation and Control Engineering (IEEE, 2011), (1), pp. 590-593.

Reference 46. K. Y. Song, "Operation of Brillouin dynamic grating in single-mode optical fibers," Opt. Lett. 36(23), 4686-8 (2011).

Reference 47. J. B. Murray and B. Redding, "Suppression of noise and cross-talk in Brillouin fiber sensors," U.S. patent application Ser. No. 17/383,263 (2021).

Reference 48. A. D. Kersey, M. A. Davis, H. J. Patrick, M. LeBlanc, K. P. Koo, C. G. Askins, M. A. Putnam, and E. J. Friebele, "Fiber grating sensors," J. Light. Technol. 15(8), 1442-1462 (1997).

Reference 49. Y. Peled and M. Tur, "Fast Brillouin optical time domain analysis for dynamic sensing," U.S. Pat. No. 8,982,340B2 (2015).

Reference 50. K. Kishida, Y. Yamauchi, and A. Guzik, "Study of optical fibers strain-temperature sensitivities using hybrid Brillouin-Rayleigh system," Photonic Sensors 4(1), 1-11 (2014).

Reference 51. J. L. Cruz, et al., "Measurement of Phase and Group Refractive Indices and Dispersion of Thermo-Optic and Strain-Optic Coefficients of Optical Fibers Using Weak Fiber Bragg Gratings," Appl. Opt. 60(10), 2824-2832 (2021).

The terminology used herein is for the purpose of describing particular embodiments only and is not intended to be limiting of inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. The term "and/or" includes any and all combinations of one or more of the associated listed items.

It will be understood that, although the terms first, second, third, etc. may be used herein to describe various elements, these elements should not be limited by these terms. These terms are only used to distinguish one element from another element. Thus, a first element discussed herein could be termed a second element without departing from the scope of the present inventive concepts.

It will also be understood that when an element is referred to as being "coupled" to/with or "connected" to/with another element, it can be directly coupled or connected to/with the other element, or intervening elements may be present. In contrast, when an element is referred to as being "directly coupled" to/with or "directly connected" to/with another element, there are no intervening elements present. Similarly, when an operation/element is referred to as being "responsive to" or "in response to" another event/operation/element, it can be directly responsive to or directly in response to the other operation/element or intervening events/operations/elements may be present. In contrast, when an operation/element is referred to as being "directly responsive to" or "directly in response to" another event/operation/element, there are no intervening events/operations/elements present.

Unless otherwise defined, all terms (including technical and scientific terms) used herein have the same meaning as commonly understood by one of ordinary skill in the art to which the inventive concepts herein belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The operations of any methods disclosed herein do not have to be performed in the exact order disclosed, unless an operation is explicitly described as following or preceding another operation and/or where it is implicit that an operation must follow or precede another operation. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description herein.

While inventive concepts have been particularly shown and described with reference to examples of embodiments thereof, it will be understood that various changes in form and details may be made therein without departing from the spirit of the following claims.

The invention claimed is:

1. A method providing temperature measurements and strain measurements distributed along an optical fiber having a first end and a second end, the method comprising:
coupling a plurality of Brillouin pump laser pulses into a first end of the optical fiber, wherein each of the plurality of Brillouin pump laser pulses has a Brillouin pump frequency;
coupling Brillouin Stokes and Brillouin Anti-Stokes probe laser beams into the second end of the optical fiber, wherein the Brillouin Stokes probe laser beam has a Brillouin Stokes probe frequency, wherein the Brillouin Anti-Stokes probe laser beam has a Brillouin Anti-Stokes probe frequency, and wherein the Brillouin Stokes probe frequency, the Brillouin Anti-Stokes probe frequency, and the Brillouin pump frequency are included in a Brillouin frequency band;
coupling a plurality of Rayleigh seed pulses of a Rayleigh seed pulse train into the optical fiber, wherein each of the plurality of Rayleigh seed pulses of the Rayleigh seed pulse train has a respective different frequency included in a Rayleigh frequency band, and wherein the Brillouin and Rayleigh frequency bands are mutually exclusive;
coupling frequencies included in the Brillouin frequency band from the first end of the optical fiber to a Brillouin detector;
coupling Rayleigh backscatter signals included in the Rayleigh frequency band from the optical fiber to a Rayleigh detector;
calculating the strain measurements and the temperature measurements at different positions distributed along the optical fiber based on outputs from the Brillouin detector and based on outputs from the Rayleigh detector.

2. The method of claim 1, wherein the plurality of Brillouin pump laser pulses comprises first and second Brillouin pump laser pulses having orthogonal polarization states, wherein the first and second Brillouin pump laser pulses are coupled into the first end of the optical fiber during a period of time between coupling an initial and a final of the Rayleigh seed pulses so that each of the strain and temperature measurements is calculated for at least a portion of the period of time between coupling the initial and the final of the Rayleigh seed pulses.

3. The method of claim 1, further comprising:
coupling a Brillouin Stokes local oscillator beam and a Brillouin Anti-Stokes local oscillator beam into the second end of the optical fiber, wherein the Brillouin Stokes local oscillator beam has a Brillouin Stokes local oscillator frequency offset from the Brillouin Stokes probe frequency, wherein the Brillouin Anti-Stokes local oscillator beam has a Brillouin Anti-Stokes local oscillator frequency offset from the Brillouin Anti-Stokes probe frequency, and wherein the Brillouin Stokes local oscillator frequency and the Brillouin Anti-Stokes local oscillator frequency are included in the Brillouin frequency band.

4. The method of claim 3, wherein the Brillouin Stokes local oscillator frequency is between the Brillouin Stokes probe frequency and the Brillouin pump frequency, and wherein the Brillouin Anti-Stokes local oscillator frequency is between the Brillouin Anti-Stokes probe frequency and the Brillouin pump frequency.

5. The method of claim 3, wherein the Brillouin Stokes probe frequency is between the Brillouin Stokes local oscillator frequency and the Brillouin pump frequency, and wherein the Brillouin Anti-Stokes probe frequency is between the Brillouin Anti-Stokes local oscillator frequency and the Brillouin pump frequency.

6. The method of claim 3, wherein the Brillouin detector includes a Stokes photodetector and an Anti-Stokes photodetector, wherein frequencies including the Brillouin Stokes probe frequency and the Brillouin Stokes local oscillator frequency are coupled with the Stokes photodetector, wherein frequencies including the Brillouin Anti-Stokes probe frequency and the Brillouin Anti-Stokes local oscillator frequency are coupled with the Anti-Stokes photodetector, and wherein the strain and temperature measurements are calculated based on outputs from the Stokes and Anti-Stokes photodetectors.

7. The method of claim 1, wherein the plurality of Brillouin pump laser pulses interact with the Brillouin Stokes probe laser beam and the Brillouin Anti-Stokes probe laser beam in the optical fiber to stimulate Brillouin scattering in the optical fiber, and wherein coupling the frequencies included in the Brillouin frequency band comprises coupling the Brillouin scattering from the first end of the optical fiber to the Brillouin detector.

8. The method of claim 1, wherein alternating ones of the plurality of Brillouin pump laser pulses have orthogonal polarization states.

9. The method of claim 1, wherein the plurality of Brillouin pump laser pulses and the Rayleigh seed pulses are provided with a same repetition rate and a same pulse width.

10. The method of claim 1, wherein the plurality of Rayleigh seed pulses are coupled into the first end of the optical fiber, and wherein the Rayleigh backscatter signals are coupled from the first end of the fiber to the Rayleigh detector.

11. The method of claim 1, wherein calculating the strain measurements and the temperature measurements comprises,
calculating respective changes in Brillouin frequency shift corresponding to the different positions distributed along the optical fiber based on the outputs from the Brillouin detector,
calculating respective changes in Rayleigh backscattered spectrum corresponding to the different positions distributed along the optical fiber based on the outputs from the Rayleigh detector, and
calculating the strain measurements and the temperature measurements at the different positions distributed along the optical fiber based on the respective changes in Brillouin frequency shift at the different positions and the respective changes in Rayleigh backscattered spectrum at the different positions.

12. The method of claim 1, wherein the Brillouin Stokes probe frequency corresponds to a Brillouin stokes peak and is shifted from the Brillouin pump frequency by the Brillouin frequency defined the optical fiber, and wherein the Brillouin Anti-Stokes probe frequency corresponds to a Brillouin anti-stokes peak and is shifted from the Brillouin pump frequency by the Brillouin frequency defined by the optical fiber.

13. A sensor providing temperature measurements and strain measurements, the sensor comprising:
an optical fiber having a first end and a second end;
a Brillouin signal generator configured to generate a plurality of Brillouin pump laser pulses, a Brillouin Stokes probe laser beam, and a Brillouin Anti-Stokes probe laser beam, wherein each of the plurality of Brillouin pump laser pulses has a Brillouin pump frequency, wherein the Brillouin Stokes probe laser beam has a Brillouin Stokes probe frequency, wherein the Brillouin Anti-Stokes probe laser beam has a Brillouin Anti-Stokes probe frequency, and wherein the Brillouin Stokes probe frequency, the Brillouin Anti-Stokes probe frequency, and the Brillouin pump frequency are included in a Brillouin frequency band;
a Rayleigh signal generator configured to generate a plurality of Rayleigh seed pulses of a Rayleigh seed pulse train, wherein each of the plurality of Rayleigh seed pulses of the Rayleigh seed pulse train has a respective different frequency included in a Rayleigh frequency band, and wherein the Brillouin and Rayleigh frequency bands are mutually exclusive;
a first coupler configured to couple the plurality of Brillouin pump laser pulses and the plurality of Rayleigh seed pulses of the Rayleigh seed pulse train into the first end of the optical fiber;
a second coupler configured to couple the Brillouin Stokes and Brillouin Anti-Stokes probe laser beams into the second end of the optical fiber;
a wavelength division multiplexer coupled with the first coupler, wherein the first coupler is further configured to couple frequencies included in the Brillouin frequency band from the first end of the optical fiber to the wavelength division multiplexer and to couple Rayleigh backscatter signals included in the Rayleigh frequency band from the first end of the optical fiber to the wavelength division multiplexer;
a Brillouin detector coupled with the wavelength division multiplexer, wherein the wavelength division multiplexer is configured to couple the frequencies included in the Brillouin frequency band to the Brillouin detector;
a Rayleigh detector coupled with the wavelength division multiplexer, wherein the wavelength division multiplexer is configured to couple the Rayleigh backscatter signals included in the Rayleigh frequency band to the Rayleigh detector; and
a controller coupled with the Brillouin detector and the Rayleigh detector, wherein the controller is configured to calculate the temperature measurements and the strain measurements at different positions distributed along the optical fiber based on outputs from the Brillouin detector and based on outputs from the Rayleigh detector.

14. The sensor of claim 13, wherein the plurality of Brillouin pump laser pulses comprises first and second Brillouin pump laser pulses having orthogonal polarization states, wherein the first and second Brillouin pump laser pulses are coupled into the first end of the optical fiber during a period of time between coupling an initial and a final of the Rayleigh seed pulses so that each of the strain and temperature measurements is calculated for at least a portion of the period of time between coupling the initial and the final of the Rayleigh seed pulses.

15. The sensor of claim 13,
wherein the Brillouin signal generator is further configured to generate a Brillouin Stokes local oscillator beam and a Brillouin Anti-Stokes local oscillator beam, wherein the Brillouin Stokes local oscillator beam has a Brillouin Stokes local oscillator frequency offset from the Brillouin Stokes probe frequency, wherein the Brillouin Anti-Stokes local oscillator beam has a Brillouin Anti-Stokes local oscillator frequency offset from the Brillouin Anti-Stokes probe frequency, and wherein the Brillouin Stokes local oscillator frequency and the Brillouin Anti-Stokes local oscillator frequency are included in the Brillouin frequency band, and
wherein the second coupler is further configured to couple the Brillouin Stokes local oscillator beam and the Brillouin Anti-Stokes local oscillator beam into the second end of the optical fiber.

16. The sensor of claim 15, wherein the Brillouin Stokes local oscillator frequency is between the Brillouin Stokes probe frequency and the Brillouin pump frequency and the Brillouin Anti-Stokes local oscillator frequency is between the Brillouin Anti-Stokes probe frequency and the Brillouin pump frequency.

17. The sensor of claim 15, wherein the Brillouin Stokes probe frequency is between the Brillouin Stokes local oscillator frequency and the Brillouin pump frequency and the Brillouin Anti-Stokes probe frequency is between the Brillouin Anti-Stokes local oscillator frequency and the Brillouin pump frequency.

18. The sensor of claim 15, wherein the Brillouin detector includes a Stokes photodetector and an Anti-Stokes photodetector, wherein the wavelength division multiplexer is further configured to couple frequencies including the Brillouin Stokes probe frequency and the Brillouin Stokes local oscillator frequency to the Stokes photodetector, wherein the wavelength division multiplexer is further configured to couple frequencies including the Brillouin Anti-Stokes probe frequency and the Brillouin Anti-Stokes local oscillator frequency to the Anti-Stokes photodetector, and wherein the controller is configured to calculate the temperature measurements and the strain measurements based on outputs from the Stokes and Anti-Stokes photodetectors.

19. The sensor of claim 13, wherein the plurality of Brillouin pump laser pulses interact with the Brillouin Stokes probe laser beam and the Brillouin Anti-Stokes probe laser beam in the optical fiber to stimulate Brillouin scattering in the optical fiber, wherein the first coupler is further configured to couple the Brillouin scattering from the first end of the optical fiber to the wavelength division multiplexer, and wherein the wavelength division multiplexer is further configured to couple the Brillouin scattering to the Brillouin detector.

20. The sensor of claim 13, wherein alternating ones of the plurality of Brillouin pump laser pulses have orthogonal polarization states.

21. The sensor of claim 13, wherein the plurality of Brillouin pump laser pulses and the Rayleigh seed pulses are provided with a same repetition rate and a same pulse width.

22. The sensor of claim 13, wherein the controller is configured to calculate the temperature measurements and the strain measurements by,
calculating respective changes in Brillouin frequency shift corresponding to the different positions distributed along the optical fiber based on the outputs from the Brillouin detector, calculating respective changes in Rayleigh backscattered spectrum corresponding to the different positions distributed along the optical fiber based on the outputs from the Rayleigh detector, and calculating the temperature measurements and the strain measurements at the different positions distributed along the optical fiber based on the respective changes in Brillouin frequency shift at the different positions and the respective changes in Rayleigh backscattered spectrum at the different positions.

23. The sensor of claim 13, wherein the Brillouin Stokes probe frequency corresponds to a Brillouin stokes peak and is shifted from the Brillouin pump frequency by a Brillouin frequency defined by the optical fiber, and wherein the Brillouin Anti-Stokes probe frequency corresponds to a Brillouin anti-stokes peak and is shifted from the Brillouin pump frequency by the Brillouin frequency defined by the optical fiber.

* * * * *